US012301906B2

(12) United States Patent
Mikami

(10) Patent No.: US 12,301,906 B2
(45) Date of Patent: May 13, 2025

(54) TERMINAL, METHOD, AND SERVER

(71) Applicant: 17LIVE Japan Inc., Tokyo (JP)

(72) Inventor: Ryo Mikami, Tokyo (JP)

(73) Assignee: 17LIVE JAPAN INC., Tokyo (JP)

( * ) Notice: Subject to any disclaimer, the term of this patent is extended or adjusted under 35 U.S.C. 154(b) by 0 days.

(21) Appl. No.: 18/082,201

(22) Filed: Dec. 15, 2022

(65) Prior Publication Data

US 2023/0421830 A1 Dec. 28, 2023

(30) Foreign Application Priority Data

Jun. 24, 2022 (JP) .................................. 2022-101733

(51) Int. Cl.
*H04N 21/266* (2011.01)
*H04N 21/2187* (2011.01)
*H04N 21/478* (2011.01)
*H04N 21/81* (2011.01)

(52) U.S. Cl.
CPC ....... *H04N 21/266* (2013.01); *H04N 21/2187* (2013.01); *H04N 21/478* (2013.01); *H04N 21/8173* (2013.01)

(58) Field of Classification Search
CPC ............. H04N 21/266; H04N 21/2187; H04N 21/478; H04N 21/8173
See application file for complete search history.

(56) References Cited

U.S. PATENT DOCUMENTS

2019/0334842 A1* 10/2019 Sato .................... H04L 65/4015
2021/0035411 A1* 2/2021 Oberberger ............ G06F 3/013

FOREIGN PATENT DOCUMENTS

| JP | 2020-017870 A | 1/2020 |
| JP | 2020-167526 A | 10/2020 |
| JP | 7071718 B1 | 5/2022 |

OTHER PUBLICATIONS

Notification of Reasons for Refusal dated Sep. 20, 2022, issued in Japanese Patent Application No. 2022-101733 with English translation (6 pgs.).

* cited by examiner

*Primary Examiner* — Joshua D Taylor
(74) *Attorney, Agent, or Firm* — Pillsbury Winthrop Shaw Pittman, LLP

(57) ABSTRACT

A terminal of a distributor of a live-stream, includes: one or more processors, and memory storing one or more computer programs configured to be executed by the one or more processors. The one or more computer programs includes instructions for: transmitting video data related to the live-stream from a server over a network, accepting input by the distributor when a gift is used for the distributor, the input being related to the used gift; and displaying, on a display, a result of determining whether to award electronic value to the distributor and/or an amount of the electronic value awarded to the distributor. The determination depends on the content of the accepted input.

11 Claims, 26 Drawing Sheets

| Stream ID | Distributor ID | Viewer ID |
|---|---|---|
| ST22 | 001A | SS5, SS12, SS43 |
| ST92 | 002B | TT3, TS2 |

| User ID | Points | Reward |
|---|---|---|
| 001A | 3243 | 1500 |
| ABCFO | 2510 | 800 |
| XX@EEEX | 1803 | 0 |
| KKKOK | 1305 | 0 |

| Gift ID | Granted Reward | Price Points | Type |
|---|---|---|---|
| TT01 | 90 | 100 | Normal |
| TE01 | 180 | 200 | Normal |
| S100 | NA | 300 | Special |
| S500 | NA | 300 | Special |
| S1000 | NA | 300 | Special |

TERMINAL, METHOD, AND SERVER

CROSS-REFERENCE TO RELATED APPLICATIONS

This application is based on and claims the benefit of priority from Japanese Patent Application Serial No. 2022-101733 (filed on Jun. 24, 2022), the contents of which are hereby incorporated by reference in its entirety.

TECHNICAL FIELD

The present disclosure relates to a terminal, a method, and a server.

BACKGROUND

With the development of IT technology, the way information is exchanged has changed. In the Showa period (1926-1989), one-way information communication via newspapers and television was the main stream. In the Heisei period (1990-2019), with the widespread availability of cell phones and personal computers, and the significant improvement in Internet communication speed, instantaneous interactive communication services such as chat services emerged, and on-demand video distribution services also become popular as storage costs were reduced. And nowadays or in the Reiwa period (2019 to present), with the sophistication of smartphones and further improvements in network speed as typified by 5G, services that enable real-time communication through video, especially live-stream services, are gaining recognition. The number of users of live-stream services is expanding, especially among young people, as such services allow people to share fun moments even when they are in physically separate locations from each other.

Gifting, such as tipping, may help live-streamers engage more with viewers and monetize their live-streams. Japanese Patent Application Publication No. 2020-017870 describes a technique to make a live-stream more exciting by showing a Nagesen (tipping) effect with which a donation from a viewer to a live-streamer is shown on the live-streaming screen Typically, when a viewer gives a gift during a live-stream, a corresponding reward is given to a streamer and an effect is displayed on a screen of the live-stream. The streamer will thank the viewer for the gift during the live-stream. This has been established as one way of communication between the streamer and viewers in live-streaming.

However, such gifting may be monotonous, and viewers and streamers may get bored with it. To avoid this, it may be possible to increase types of effects. However, the gifting mechanism will not be changed, so it will not be a fundamental solution.

SUMMARY

The present disclosure has been made in view of the above, and one object of disclosure is to provide a technique for making live-streaming more enjoyable by promoting interaction between streamers and viewers through gifting in the live-streaming.

One aspect of the disclosure relates to a terminal. The terminal of a distributor of a live-stream, includes: one or more processors; and memory storing one or more computer programs configured to be executed by the one or more processors. The one or more computer programs including instructions for: transmitting video data related to the live-stream to a server over a network, accepting input by the distributor when a gift is used for the distributor, the input being associated with the gift; and displaying, on a display during the live-stream, a result of determining whether to award electronic value to the distributor and/or an amount of the electronic value awarded to the distributor. The determination is performed depending on the content of the accepted input.

Another aspect of the present disclosure relates to a server. The server, includes: a relay unit for relaying a video data related to a live-stream from a distributor's terminal to a viewer's terminal; a receiving unit for receiving a gift use signal from the viewer's terminal during the live-stream over a network, the gift use signal indicating that a gift is used for the distributor; a transmitting unit for transmitting, in response to the reception of the gift use signal, a request signal to the distributor's terminal over the network, the request signal requesting input related to the used gift; a receiving unit for receiving a response signal from the distributor's terminal over the network, the response signal indicating a content of the input by the distributor; a determining unit for determining whether to award an electronic value to the distributor and/or an amount of the electronic value awarded to the distributor depending on the content of the input indicated by the response signal; and a result transmitting unit for transmitting a result of the determination to the distributor's terminal and the viewer's terminal during the live-stream over the network.

It should be noted that the components described throughout this disclosure may be interchanged or combined. The components, features, and expressions described above may be replaced by devices, methods, systems, computer programs, recording media containing computer programs, etc. Any such modifications are intended to be included within the spirit and scope of the present disclosure.

Advantageous Effects

According to the aspects of the disclosure, it is possible to make live-streaming more enjoyable by promoting interaction between a streamer and viewers through gifting in the live-streaming.

BRIEF DESCRIPTION OF THE DRAWINGS

FIG. 4 is a data structure diagram showing an example of a stream DB in FIG. 3.

FIG. 5 is a data structure diagram showing an example of a user DB in FIG. 3.

FIG. 6 is a data structure diagram showing an example of a gift DB in FIG. 3.

DESCRIPTION OF THE EMBODIMENTS

Like elements, components, processes, and signals throughout the figures are labeled with same or similar designations and numbering, and the description for the like elements will not be hereunder repeated. For purposes of clarity and brevity, some of the components that are less related and thus not described are not shown in the figures.

In a live-streaming system according to an embodiment of the disclosure, when a viewer gives a gift during a live-stream, a distributor (streamer) is asked to make a selection or other input. Based on the content of the input by the distributor, it is determined whether to grant a reward to the distributor and/or the amount of reward to be granted. The viewer and distributor are notified of the determination result during the live-stream. This realizes more active interaction between the viewer and the distributor through gifting. Specifically, not only giving a gift, but also there will be active conversations between the distributor and viewers about which choices he/she should make and about the result obtained. Accordingly, the connection between the distributor and viewer can be enriched through the live-stream.

Figure 1:
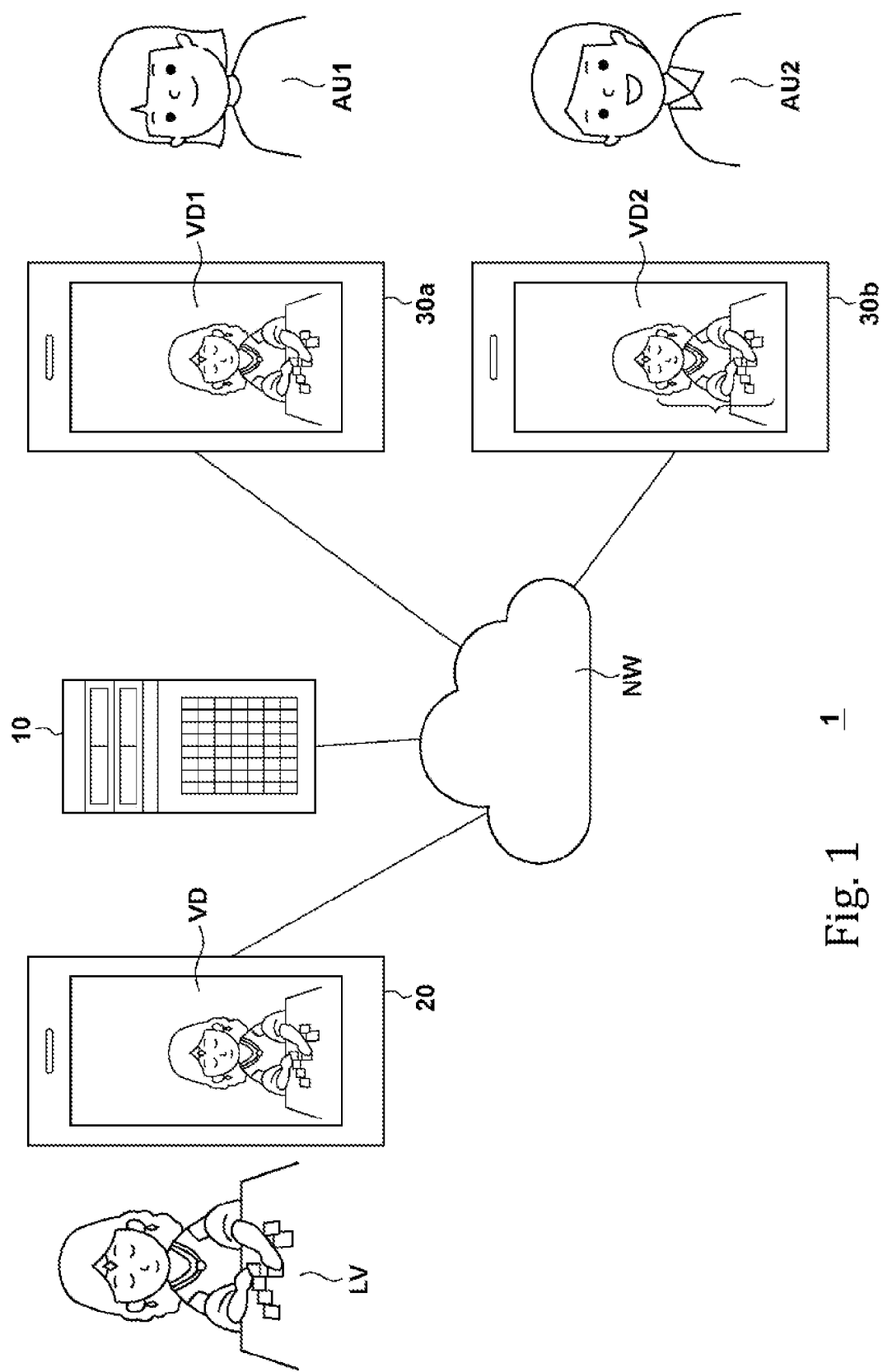
FIG. 1 schematically illustrates a configuration of a live-streaming system in one embodiment.

FIG. 1 schematically illustrates a configuration of a live-streaming system 1 according one embodiment of the disclosure. The live-streaming system 1 provides an interactive live-stream service that allows a distributor LV (also referred to as a liver or streamer) and a viewer AU (also referred to as audience) (AU1, AU2 . . . ) to communicate in real time. As shown in FIG. 1, the live-streaming system 1 includes a server a user terminal 20 on the distributor side, and user terminals 30 (30a, 30b . . . ) on the audience side. The distributor and viewers may be collectively referred to as users. The server 10 may be one or more information processing devices connected to a network NW. The user terminals 20 and 30 may be, for example, mobile terminal devices such as smartphones, tablets, laptop PCs, recorders, portable gaming devices, and wearable devices, or may be stationary devices such as desktop PCs. The server 10, the user terminal and the user terminals 30 are interconnected so as to be able to communicate with each other over the various wired or wireless network NW.

The live-streaming system 1 involves the distributor LV, the viewers AU, and an administrator (not shown) who manages the server 10. The distributor LV is a person who broadcasts contents in real time by recording the contents with his/her user terminal 20 and uploading them directly to the server 1. Examples of the contents may include the distributor's own songs, talks, performances, fortune-telling, gameplays, and any other contents. The administrator provides a platform for live-streaming contents on the server 10, and also mediates or manages real-time interactions between the distributor LV and the viewers AU. The viewers AU access the platform at their user terminals 30 to select and view a desired content. During live-streaming of the selected content, the viewer AU performs operations to comment, cheer, or ask fortune-telling via the user terminal 30, the distributor LV who is delivering the content responds to such a comment, cheer, or request and such response is transmitted to the viewer AU via video and/or audio, thereby establishing an interactive communication.

As used herein, the term "live-streaming" or "live-stream" may mean a mode of data transmission that allows a content recorded at the user terminal 20 of the distributor LV to be played and viewed at the user terminals 30 of the viewers AU substantially in real time, or it may mean a live broadcast realized by such a mode of transmission. The live-streaming may be achieved using existing live delivery technologies such as HTTP Live-streaming, Common Media Application Format, Web Real-Time Communications, Real-Time Messaging Protocol and MPEG DASH. The live-streaming includes a transmission mode in which, while the distributor LV is recording contents, the viewers AU can view the contents with a certain delay. The delay is acceptable as long as interaction between the distributor LV and the viewers AU can be at least established. Note that the live-streaming is distinguished from so-called on-demand type transmission, in which contents are entirely recorded and the entire data is once stored on the server, and the server provides users with the data at any subsequent time upon request from the users.

The term "video data" herein refers to data that includes image data (also referred to as moving image data) generated using an image capturing function of the user terminals 20 and 30 and audio data generated using an audio input function of the user terminals 20 and 30. Video data is reproduced in the user terminals 20 and 30, so that the users can view contents. In this embodiment, it is assumed that between video data generation at the distributor's user terminal and video data reproduction at the viewer's user terminal, processing is performed onto the video data to change its format, size, or specifications of the data, such as compression, decompression, encoding, decoding, or transcoding. However, the content (e.g., video images and audios) represented by the video data before and after such processing does not substantially change, so that the video data after such processing is herein described as the same as the video data before such processing. In other words, when video data is generated at the distributor's user terminal and then played back at the viewer's user terminal via the server 10, the video data generated at the distributor's user terminal, the video data that passes through the server 1, and the video data received and reproduced at the viewer's user terminal are all the same video data.

In the example in FIG. 1, the distributor LV is live-streaming his/her fortune telling. The user terminal 20 of the distributor LV generates video data by recording images and sounds of the distributor LV telling fortune, and the generated data is transmitted to the server 10 over the network NW. At the same time, the user terminal 20 displays a recorded video image VD of the distributor LV on the display of the user terminal 20 to allow the distributor LV to check the live-stream currently performed.

The user terminals 30*a* and 30*b* of the viewers AU1 and AU2 respectively, who have requested the platform to view the live-stream of the distributor LV, receive video data related to the live-stream (may also be herein referred to as "live-streaming video data") over the network NW and reproduce the received video data to display video images VD1 and VD2 on the displays and output audio through the speakers. The video images VD1 and VD2 displayed at the user terminals 30*a* and 30*b*, respectively, are substantially the same as the video image VD captured by the user terminal 20 of the distributor LV, and the audio outputted at the user terminals 30*a* and 30*b* is substantially the same as the audio recorded by the user terminal 20 of the distributor LV.

Recording of the images and sounds at the user terminal 20 of the distributor LV and reproduction of the video data at the user terminals 30*a* and 30*b* of the viewers AU1 and AU2 are performed substantially simultaneously. Once the viewer AU1 types a comment about the fortune told by the distributor LV on the user terminal 30*a*, the server 10 displays the comment on the user terminal 20 of the distributor LV in real time and also displays the comment on the user terminals 30*a* and 30*b* of the viewers AU1 and AU2, respectively. When the distributor LV reads the comment and develops his/her talk to cover and respond the comment, the video and sound of the talk are displayed on the user terminals 30*a* and 30*b* of the viewers AU1 and AU2, respectively. This interactive action is recognized as establishment of a conversation between the distributor LV and the viewer AU1. In this way, the live-streaming system 1 realizes the live-streaming that enables the interactive communication, not one-way communication.

Figure 2:
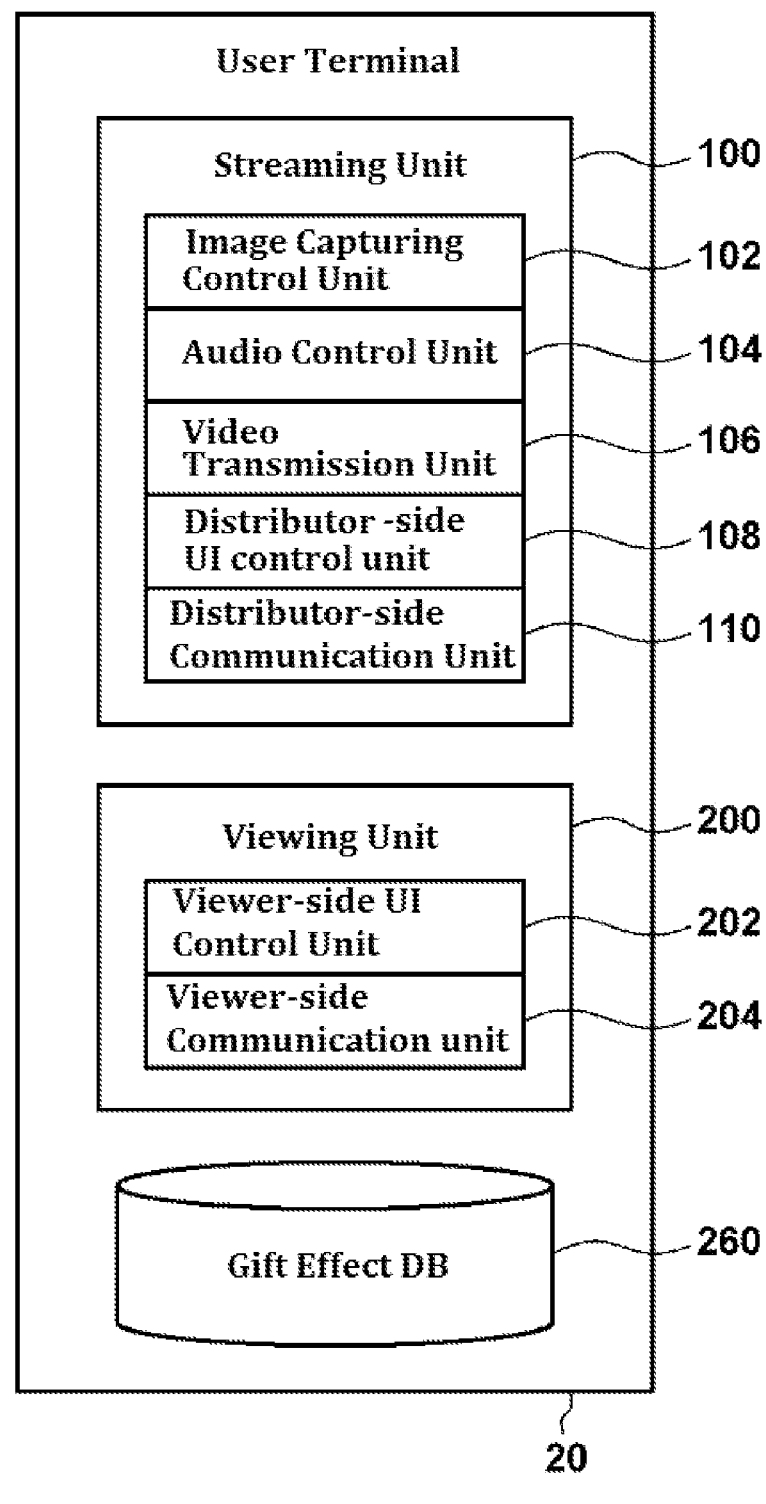
FIG. 2 is a block diagram showing functions and configuration of a user terminal shown in FIG. 1.

FIG. 2 is a block diagram showing functions and configuration of the user terminal 20 of FIG. 1. The user terminals 30 have the same functions and configuration as the user terminal 20. The blocks in FIG. 2 and the subsequent block diagrams may be realized by elements such as a computer CPU or a mechanical device in terms of hardware, and can be realized by a computer program or the like in terms of software. The blocks shown in the drawings are, however, functional blocks realized by cooperative operation between hardware and software. Therefore, it is understood by those skilled in the art that these functional blocks can be realized in various forms by combining hardware and software.

The distributor LV and the viewers AU download and install a live-streaming application program (hereinafter referred to as a live-streaming application) according to the embodiment, onto the user terminals 20 and 30 from a download site over the network NW. Alternatively, the live-streaming application may be pre-installed on the user terminals 20 and 30. When the live-streaming application is executed on the user terminals 20 and 30, the user terminals 20 and 30 communicate with the server 10 over the network NW to implement various functions. Hereinafter, the functions implemented by (processors such as CPUs of) the user terminals 20 and 30 by running the live-streaming application will be described as functions of the user terminals 20 and 30. These functions are realized in practice by the live-streaming application on the user terminals 20 and 30. In any other embodiments, these functions may be realized by a computer program that is written in a programming language such as HTML (HyperText Markup Language), transmitted from the server 10 to web browsers of the user terminals 20 and 30 over the network NW, and executed by the web browsers.

The user terminal 20 includes a streaming unit 100 that generates video data in which the user's image and sound are recorded and provides the video data to the server 10, a viewing unit 200 to which the video data is provided from the server 10 to reproduce the video data, and a gift effect DB 260. The user activates the streaming unit 100 when the user performs live-streaming, and activates the viewing unit 200 when the user views a video. The user terminal in which the streaming unit 100 is activated is the distributor's terminal, i.e., the user terminal that generates the video data, and the user terminal in which the viewing unit 200 is activated is the viewer's terminal, i.e., the user terminal in which the video data is reproduced and played.

The streaming unit 100 includes an image capturing control unit 102, an audio control unit 104, a video transmission unit 106, a distributor-side UI control unit 108, and a distributor-side communication unit 110. The image capturing control unit 102 is connected to a camera (not shown in FIG. 2) and controls image capturing performed by the camera. The image capturing control unit 102 obtains image data from the camera. The audio control unit 104 is connected to a microphone (not shown in FIG. 2) and controls audio input from the microphone. The audio control unit 104 obtains audio data through the microphone. The video transmission unit 106 transmits video data including the image data obtained by the image capturing control unit 102 and the audio data obtained by the audio control unit 104 to the server 10 over the network NW. The video data is transmitted by the video transmission unit 106 in real time. That is, the generation of the video data by the image capturing control unit 102 and the audio control unit 104, and the transmission of the generated video data by the video transmission unit 106 are performed substantially at the same time.

The distributor-side UI control unit 108 controls an UI for the distributor. The distributor-side UI control unit 108 is connected to a display (not shown in FIG. 2), and displays a video on the display by reproducing the video data that is to be transmitted by the video transmission unit 106. The viewing-side UI control unit 108 is also connected to input means (not shown in FIG. 2) such as touch panels, keyboards, and displays, and obtains the distributor's input via the input means. The distributor-side UI control unit 108 superimposes a predetermined frame image on the video image. The frame image includes various user interface objects (hereinafter simply referred to as "objects") for accepting inputs from the distributor, comments entered by the viewers, and information obtained from the server 10. The distributor-side UI control unit 108, for example, accepts tap input by the distributor on the objects.

The distributor-side communication unit 110 controls communication with the server 10 during a live-stream. The distributor-side communication unit 110 transmits the content of the distributor's input that has been obtained by the distributor-side UI control unit 108 to the server 10 over the network NW. The distributor-side communication unit 110 receives various information associated with the live-stream from the server 10 over the network NW.

The viewing unit 200 includes a viewer-side UI control unit 202 and a viewer-side communication unit 204. The viewer-side communication unit 204 controls communication with the server 10 during a live-stream. The viewer-side communication unit 204 receives, from the server 10 over the network NW, video data related to the live-stream in which the distributor and the viewer participate.

The viewing-side UI control unit 202 controls the UI for the viewer. The viewer-side UI control unit 202 is connected to a display and a speaker (not shown in FIG. 2), and reproduces the received video data to display video images on the display and output audio through the speaker. The state where the image is outputted to the display and the audio is outputted from the speaker can be referred to as "the video data is played". The viewer-side UI control unit 202 is also connected to input means (not shown in FIG. 2) such as touch panels, keyboards, and displays, and obtains viewer's input via the input means. The viewer-side UI control unit 202 superimposes a predetermined frame image on an image generated from the video data obtained from the server 10. The frame image includes various objects for accepting inputs from the viewer, comments entered by the viewer, and information obtained from the server 10. The viewer-side communication unit 204 transmits the content of the viewer's input that has been obtained by the viewer-side UI control unit 202 to the server 10 over the network NW.

The gift effect DB 260 holds information on gift effects that the user terminal 20 has downloaded from the server 10 over the network NW. The gift effect DB 260 holds gift IDs for identifying each gift, results when gifts are special gifts (described later), and data for realizing each effect corresponding to respective gift or result (hereinafter referred to as "effect data"), in association with each other. The effect is a visual, auditory or tactile effect (for example, vibration) or a combination thereof that characterizes a gift. Examples of the visual effect include animation, images, and flashing/blinking. Examples of the auditory effect include sound effects and voice. The effect data is data for realizing such an effect on the user terminal 20, and the user terminal realizes such an effect by processing the effect data. Since the technique for realizing the effect data itself is known, it will not be hereunder described in detail.

Figure 3:
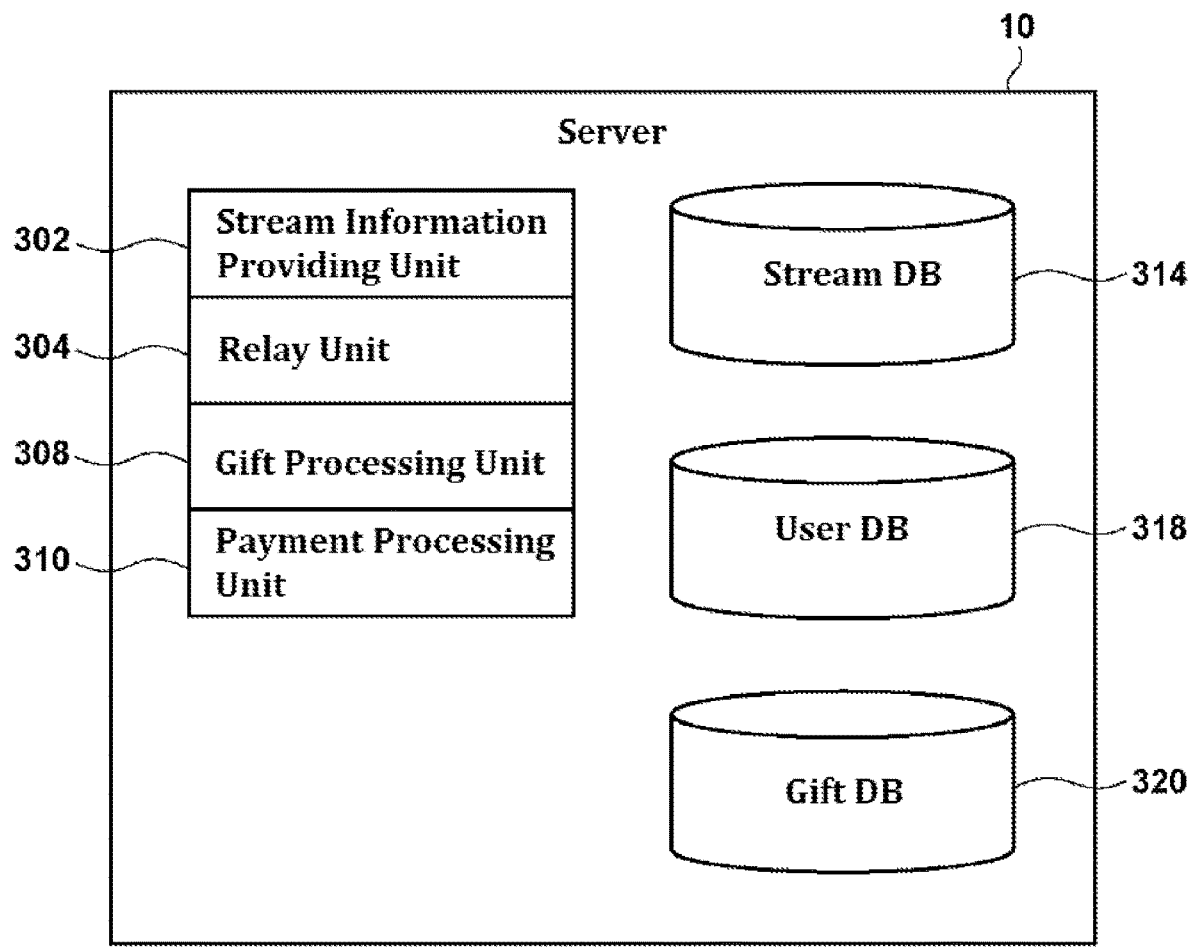
FIG. 3 is a block diagram showing functions and configuration of a server shown in FIG. 1.

FIG. 3 is a block diagram showing functions and configuration of the server 10 of FIG. 1. The server 10 includes a stream information providing unit 302, a relay unit 304, a gift processing unit 308, a payment processing unit 310, a stream DB 314, a user DB 318, and a gift DB 322.

FIG. 4 is a data structure diagram showing an example of the stream DB 314 of FIG. 3. The stream DB 314 holds information regarding live-streams currently taking place. The stream DB 314 stores a stream ID for identifying a live-stream on a live distribution platform provided by the live-streaming system 1, a distributor ID, which is a user ID for identifying the distributor who provides the live-stream, and a viewer ID, which is a user ID for identifying a viewer of the live-stream, in association with each other. In the live-streaming platform provided by the live-streaming system 1 of the embodiment, when a user live-streams, the user becomes a distributor, and when the same user views a live-stream broadcast by another user, the user also becomes a viewer. Therefore, the distinction between a distributor and a viewer is not fixed, and a user ID registered as a distributor ID at one time may be registered as a viewer ID at another time.

FIG. 5 is a data structure diagram showing an example of the user DB 318 of FIG. 3. The user DB 318 holds information regarding users. The user DB 318 stores a user ID for identifying a user, points held by the user, and a reward given to the user, in association with each other. The points are an electronic representation of value circulated in the live-streaming platform. Users are able to purchase points by credit card or other means of payment. A reward is an electronic representation of value defined in the live-streaming platform and is used to determine the amount of money the distributor receives from the administrator of the live-streaming platform. On the live-streaming platform, when viewers give gifts to the distributor during or after his/her live-stream, the viewer's points are consumed and the distributor's reward is increased by a corresponding amount.

FIG. 6 is a data structure diagram showing an example of the gift DB 320 of FIG. 3. The gift DB 320 holds information regarding gifts available for the viewers in the live-streaming. A gift is electronic data with the following characteristics:

- It can be purchased in exchange for the points or money, or can be given for free.
- It can be given by a viewer to a distributor. Giving a gift to a distributor is also referred to as using the gift or throwing the gift.
- Some gifts may be purchased and used at the same time, and some gifts may be purchased and then used at any time later by the purchaser viewer.
- When a viewer gives a gift to a distributor, the distributor is given a corresponding reward. Note that a reward may not be given depending on the content of input by the distributor.
- When a gift is used, the use may trigger an effect associated with the gift. For example, an effect corresponding to the gift will appear on the live-streaming room screen.

The gift DB 320 stores: a gift ID for identifying a gift; a granted reward, which is a reward given to a distributor when the gift is given to the distributor; price points, which is the amount of points to be paid for use of the gift; and a type of the gift, in association with each other. A viewer is able to give a desired gift to a distributor by paying the price points of the desired gift while viewing the live-stream. The payment of the price points may be made by an appropriate electronic payment means. For example, the payment may be made by the viewer paying the price points to the administrator. Alternatively, bank transfers or credit card payments may be available. The administrator is able to desirably set the relationship between the granted reward and the price points. For example, it may be set as the granted reward=the price points. Alternatively, points obtained by multiplying the granted reward by a predetermined coefficient such as 1.2 may be set as the price points, or points obtained by adding predetermined fee points to the granted reward may be set as the price points.

The type of gift indicates whether the gift is a normal gift or special gift. The normal gift and special gift are different types of gifts. When a viewer uses the normal gift, a corresponding effect is displayed in the live-stream and a corresponding reward is given to the distributor, but the distributor is not required to provide any input. Whereas the special gift is a gift with which the distributor is required to provide input. When a viewer uses the special gift, the distributor is first requested to provide input on the gift. A reward given to the distributor and the corresponding effect are determined depending on the content of the input by the distributor. In other words, the effect resulting from the giving of the special gift changes depending on the content of the input by the distributor.

Referring again to FIG. 3, upon reception of a notification from the user terminal 20 on the distributor side to start a live-stream over the network NW, the distribution information providing unit 302 registers in the stream DB 314 a stream ID identifying this live-stream and a distributor ID identifying the distributor who hosts the live-stream. When receiving a request to provide information about live-streams from the viewer-side communication unit 204 of the viewing unit 200 of the user terminal 30 on the viewer side over the network NW, the distribution information providing unit 302 retrieves currently available live-streams from the stream DB 314 and makes a list of them. The distribution information providing unit 302 transmits the generated list to the requesting user terminal 30 over the network NW. The viewing-side UI control unit 202 of the requesting user terminal 30 generates a live-stream selection screen based on the received list and displays it on the display of the user terminal 30.

Once the viewer-side communication unit 204 of the user terminal 30 receives the viewer's selection result of the live-stream on the live-stream selection screen, the input information transmission unit 206 generates a distribution request including the stream ID of the selected live-stream, and transmits the request to the server 10 over the network NW. The distribution information providing unit 302 starts providing, to the requesting user terminal 30, the live-stream specified by the stream ID included in the received distribution request. The distribution information providing unit 302 updates the stream DB 314 to include the user ID of the viewer of the requesting user terminal 30 into the viewer IDs of the stream ID.

The relay unit 304 relays the video data from the distributor-side user terminal 20 to the viewer-side user terminal 30 in the live-stream started by the distribution information providing unit 302. The relay unit 304 receives from the viewer-side communication unit 204 a signal that represents user input by a viewer during the live-stream or reproduction of the video data. The signal that represents user input may be an object specifying signal for specifying an object displayed on the display of the user terminal 30, and the object specifying signal includes the viewer ID of the viewer, the distributor ID of the distributor of the live-stream that the viewer watches, and an object ID that identifies the object. When the object is a gift icon, the object ID is the gift ID. The object specifying signal in that case is a gift use signal indicating that a viewer uses a gift for a distributor. Similarly, the relay unit 304 receives from the distributor-side communication unit 110 of the streaming unit 100 in the user terminal 20 a signal that represents user input by the distributor during reproduction of the video data, such as the object specifying signal.

The gift processing unit 308 updates, for the normal gift, the user DB 318 so as to increase the reward of the distributor depending on a granted reward of the gift identified by the gift ID included in the object specifying signal. Specifically, the gift processing unit 308 refers to the gift DB 320 to specify a granted reward for the gift ID included in the received gift use signal. The gift processing unit 308 then updates the user DB 318 to add the determined granted reward to the reward of the distributor ID included in the gift use signal signal. A process related to the special gift will be described later in detail.

The payment processing unit 310 processes, for the normal gift, payment of a price of the gift by a viewer in response to reception of the gift use signal. Specifically, the payment processing unit 310 refers to the gift DB 320 to specify the price points of the gift identified by the gift ID included in the gift use signal. The payment processing unit 310 then updates the user DB 318 to subtract the specified price points from the points of the viewer identified by the viewer ID included in the gift use signal.

Figure 7:
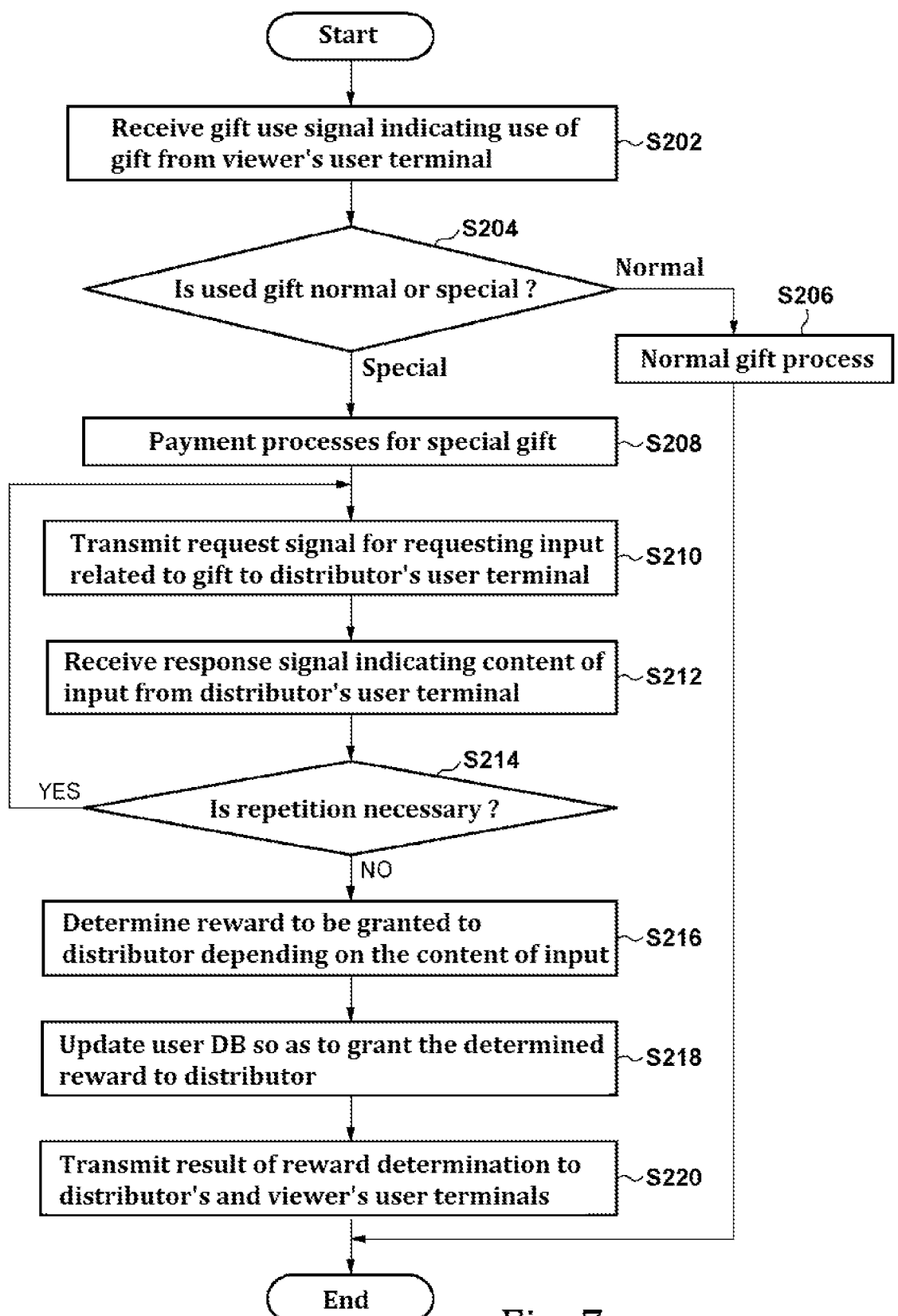
FIG. 7 is a flow chart showing a series of steps of a process performed in the live-streaming system when a viewer uses a gift during a live-stream.

The operation of the live-streaming system 1 with the above configuration will be now described. FIG. 7 is a flow chart showing a series of steps of a process performed in the live-streaming system 1 when a viewer uses a gift during a live-stream. The relay unit 304 receives from the viewer-side communication unit 204 of the viewer's user terminal 30 the gift use signal indicating the use of a gift (S202). The gift processing unit 308 determines the type of the gift identified by the gift ID included in the gift use signal, in other words, the gift used by the viewer (S204). The gift processing unit 308 refers to the gift DB 320 to obtain the type of the gift identified by the gift ID included in the gift use signal. When the obtained type is determined to be normal, in other words, the used gift is the normal gift (normal in S204), the reward granting step and payment step are performed as described above (S206). The gift processing unit 308 then generates a normal gift processing completion signal including the gift ID of the normal gift used, and sends it to the user terminal 20 of the distributor of the live-stream and the viewer's user terminal 30 over the network NW. The distributor-side communication unit 110 in the distributor's user terminal 20 receives the normal gift processing completion signal, and the distributor-side UI control unit 108 obtains effect data identified by the gift ID included in the signal from the gift effect DB 260. The distributor-side UI control unit 108 displays the effect on the display based on the obtained effect data. The same steps are performed at the viewer's user terminal 30, and the effect corresponding to the normal gift used is displayed on the display. This effect may be the same as or similar to the effect displayed at the distributor's user terminal 20.

When the type obtained in step S204 is determined to be special, in other words, when the used gift is the special gift (special in S204), the payment processing unit 310 processes the payment for the special gift (S208). Specifically, the payment processing unit 310 refers to the gift DB 320 to specify the price points of the special gift. The payment processing unit 310 then updates the user DB 318 to subtract the specified price points from the points of the viewer identified by the viewer ID included in the gift use signal. The gift processing unit 308 generates a request signal for requesting input related to the special gift and sends it to the distributor's user terminal 20 over the network NW (S210). The gift processing unit 308 includes the gift ID of the special gift used by the viewer in the request signal. At the distributor's user terminal 20, the requested input is made by the distributor and a response signal indicating the content of the input by the distributor is generated. The gift processing unit 308 receives the response signal from the distributor's user terminal 20 over the network NW (S212).

The gift processing unit 308 determines whether the above steps need to be performed again (S214). When it is determined that repetition of the steps is necessary, the process returns to step S210. Whereas when it is determined that the repetition is unnecessary, the process proceeds to step S216. For example, when the special gift is a special gift that requires multiple inputs, if the number of inputs provided so far by the distributor has not reached a predetermined number of times, it is determined that the repetition is necessary. If the number of inputs has reached the predetermined number of times, it is determined that the repetition is not necessary. Alternatively, in the case of another type of the special gift in which the input is repeatedly requested when winning and otherwise the input request is stopped, it is determined that the repetition is necessary when the content of the input included in the response signal received in step S212 corresponds to the winning. Whereas when the content of the input dose not corresponds to the winning, it is determined that the repetition is unnecessary. In this way, the gift processing unit 308 may request input more than one time. In addition, the distribution-side UI control unit 108 of the distributor's user terminal 20 is configured to be able to receive the input more than one time.

The gift processing unit 308 determines a reward to be granted to the distributor depending on the content of the input indicated by the response signal received in step S212 (S216). The gift processing unit 308 determines whether to reward the distributor and/or determines the amount of reward to be granted to the distributor, depending on the content of the input indicated by the response signal. For example, the response signal indicates an option selected by the distributor, and the gift processing unit 308 determines whether to give a reward (win or lose) and the amount of the reward according to the option. Alternatively, the response signal indicates the number of inputs or the number of taps made per unit time, and the gift processing unit 308 determines whether to give a reward or determines the amount of the reward depending on the number of taps.

The gift processing unit 308 updates the user DB 318 so as to grant the reward determined in step S216 to the distributor (S218). The gift processing unit 308 then updates the user DB 318 to add the determined reward to the reward of the distributor ID included in the gift use signal received in step S202.

The gift processing unit 308 transmits the result determined in step S216 to the user terminal 20 of the distributor and the user terminal 30 of the viewer during the live-stream over the network NW (S220). The gift processing unit 308 generates a result notification signal that includes the results determined in step S216 of whether to give a reward to the distributor and/or the amount of the reward to be given to the distributor, and transmits the signal to each of the user terminals 20 and 30 over the network NW. The distributor-side communication unit 110 of the distributor user terminal receives the result notification signal, and the distributor-side UI control unit 108 obtains the effect data identified by the result included in the signal from the gift effect DB 260. The distributor-side UI control unit 108 displays the effect on the display based on the obtained effect data. The same steps are performed at the viewer's user terminal 30, and the effect corresponding to the determined result is displayed on the display. This effect may be the same as or similar to the effect displayed at the distributor's user terminal 20.

<Special Gift with Options One of Which Corresponding to Jackpot>

Figure 8:
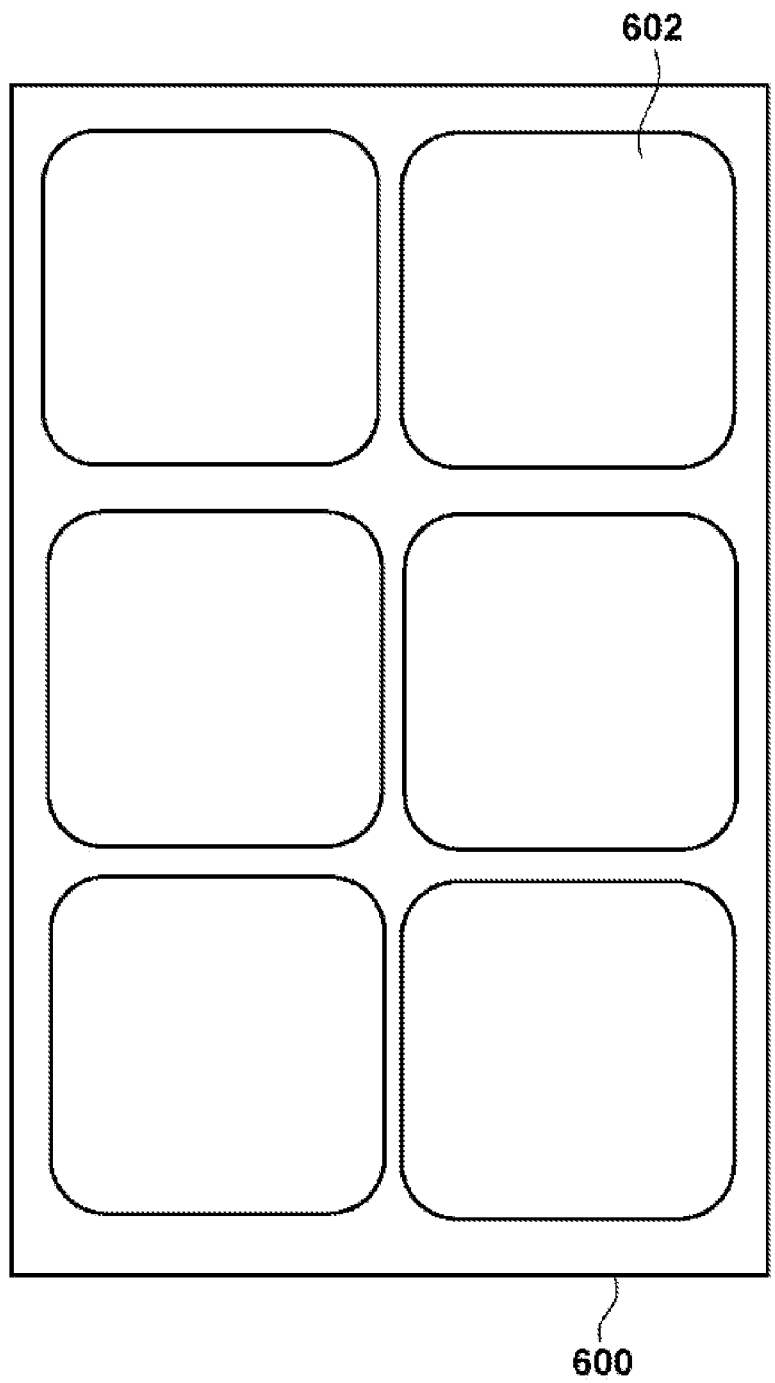
FIG. 8 is a representative screen image of a live-streaming selection screen displayed on a display of a viewer's user terminal.

FIG. 8 is a representative screen image of the live-stream selection screen 600 displayed on the display of the viewer's user terminal 30. The live-stream selection screen 600 includes thumbnails 602 indicating live-streams in the list of currently available live-streams received from the server. The viewer-side UI control unit 202 generates the live-stream selection screen 600 based on the list of live-streams obtained from the server 10 and shows the screen on the display.

Figure 9:
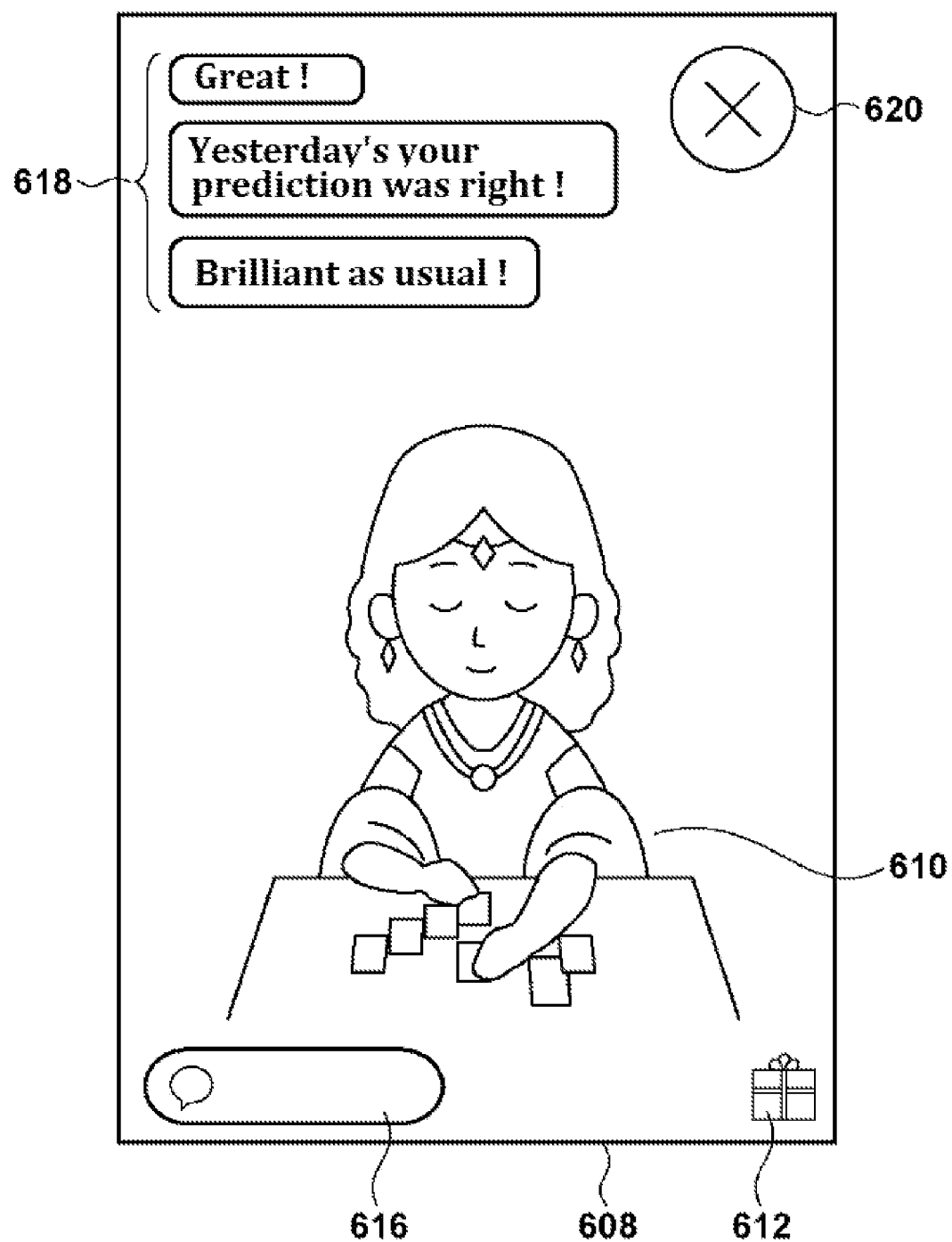
FIG. 9 is a representative screen image of a live-streaming room screen displayed on the display of the viewer's user terminal.

FIG. 9 is a representative screen image of a live-streaming room screen 608 shown on the display of the viewer's user terminal 30. Once the viewer taps one of the thumbnails 602 on the live-stream selection screen 600 of FIG. 8, the live-streaming room screen 608 of FIG. 9 is shown on the display. The live-streaming room screen 608 displays a video image generated by the user terminal 20 of the distributor in real time. The live-streaming room screen 608 includes a video image 610 of a distributor obtained by reproducing the video data received from the server 10, a gift object 612, a comment input region 616, a comment display region 618, and a quit viewing button 620. The viewer-side UI control unit 202 superimposes other objects such as the gift object 612, the comment input region 616, the comment display region 618, and the quit viewing button 620 on the video image 610 obtained by reproducing the video data to generate the live-streaming room screen 608.

The comment display region 618 may include a comment entered by the viewer and comments entered by other viewers, and notifications from the system. The notifications from the system may include information on who gave which gift to the distributor, and the result included in the result notification signal. The viewer-side UI control unit unit 202 generates the comment display region 618 including comments of other viewers and received from the server 10 and notifications from the system, and the viewer-side UI control unit 202 includes the generated comment display region 618 in the live-streaming room screen 608.

The commenting zone 716 accepts comment inputs by the viewer. The viewer-side communication unit 204 generates a comment input signal that includes the comment entered in the comment input region 616, and transmits the signal to the server 10 over the network NW. At the same time, the viewer-side UI control unit 202 updates the comment display region 618 to display the comment entered in the comment input region 616.

The quit viewing button 620 is an object for accepting an instruction from the viewer to quit viewing the live-stream.

When a tap on the gift object 612 is detected, the viewer-side UI control unit 202 of the user terminal 30 generates a gift information request and transmits the request to the server 10 over the network NW. Upon receipt of the gift information request, the relay unit 304 of the server 10 refers to the gift DB 320 and specifies available gift IDs. The server 10 generates gift information that includes the specified gift ID, and transmits it to the user terminal 30 of the requester. The viewer-side UI control unit 202 of the user terminal 30 generates a gift region 622 for receiving selection of the gift based on the received gift information. The gift region 622 includes a gift object 624 of the normal gift and a gift object 626 of the special gift identified by the gift IDs included in the received gift information. The viewer-side UI control unit 202 displays the generated gift region 622 on the live-streaming room screen 608.

Figure 10:
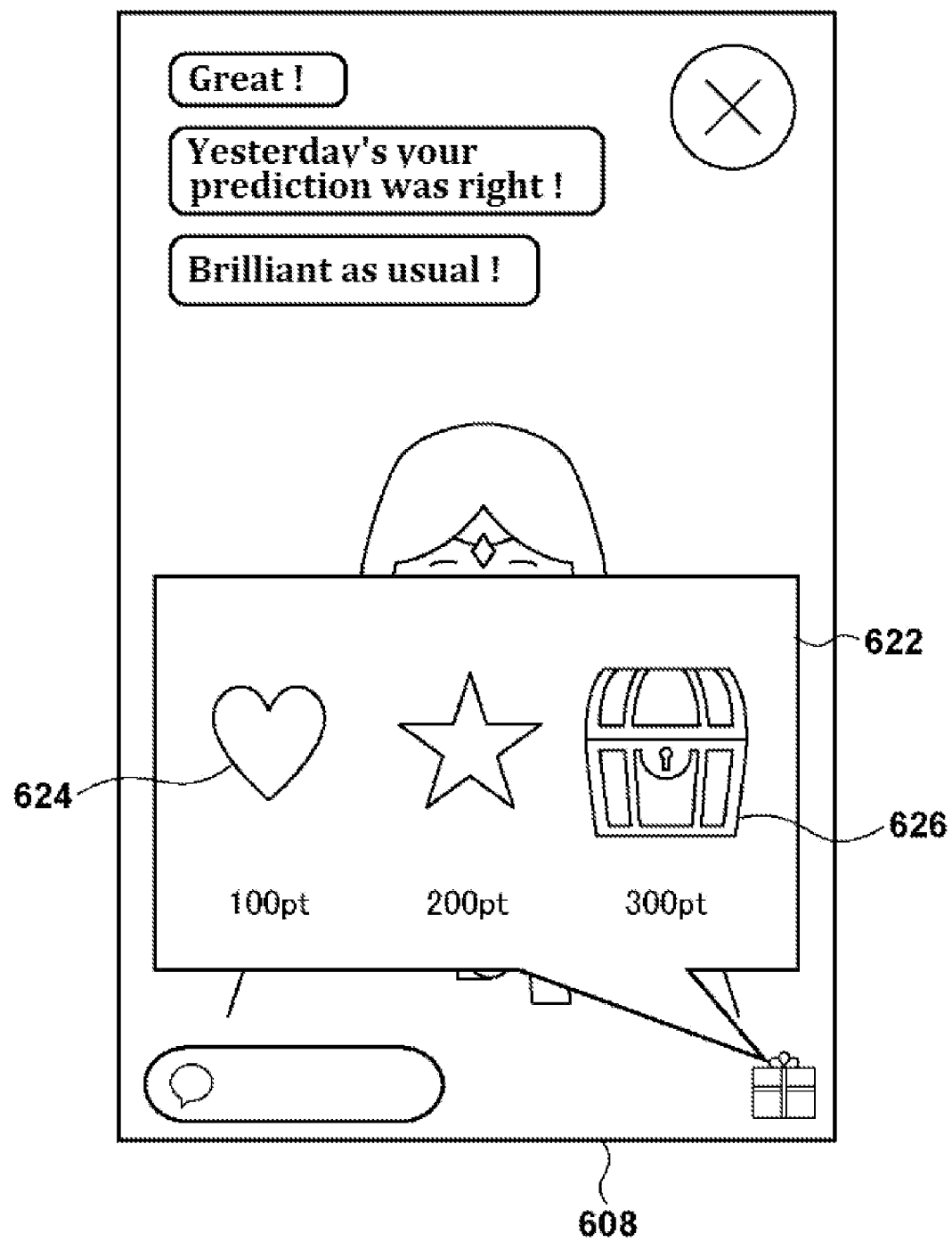
FIG. 10 is a representative screen image of a live-streaming room screen on which a gift region is superimposed on the display of the viewer's user terminal.

FIG. 10 is a representative screen image of the live-streaming room screen 608 on which the gift region 622 is superimposed on the display of the viewer's user terminal 30. The gift region 622 includes the gift object 624 of the normal gift and the gift object 626 of the special gift. Once the viewer taps the gift object 626 in the gift region 622 on the live-streaming room screen 608 of FIG. 10, the viewer-side UI control unit 202 of the user terminal 30 accepts the selection of the gift object 626 by the viewer. The viewer-side communication unit 204 generates a gift use signal including the gift ID of the special gift represented by the selected gift object 626 and transmits it to the server 10.

Figure 11:
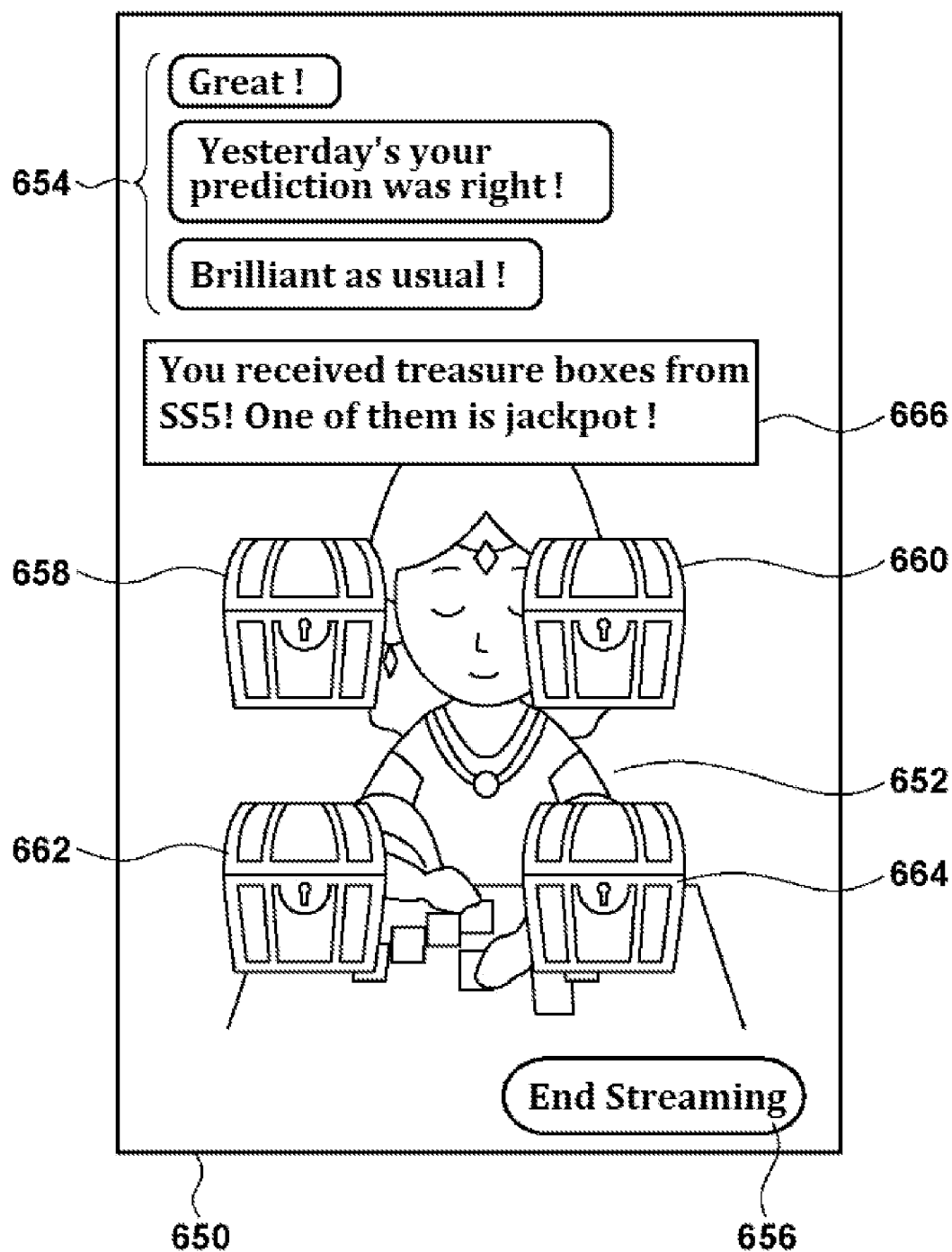
FIG. 11 is a representative screen image of a live-streaming room screen displayed on the display of the distributor's user terminal.

FIG. 11 is a representative screen image of a live-streaming room screen 650 shown on the display of the distributor's user terminal. The live-streaming room screen 650 is configured to accept the distributor's selection of one of four objects 658, 660, 662, and 664 associated with the special gift, when the special gift is used for the distributor.

When the distributor starts the live-stream on the user terminal 20, a live-streaming room screen is shown on the display. The live-streaming room screen displays a video image generated by the user terminal 20 of the distributor in real time. In response to the gift use signal transmitted with reference to FIG. 10, the distributor-side communication unit 110 of the distributor's user terminal 20 receives the request signal from the server 10 over the network NW. The distributor-side UI control unit 108 superimposes on the live-streaming room screen a plurality of objects corresponding to the special gift identified by the gift ID included in the received request signal. The live-streaming room screen 650 of FIG. 11 includes a video image 652 of the distributor obtained by reproducing the video data on the distributor's user terminal 20, s comment display region 654, a streaming end button 656, the plurality of objects 658, 660, 662, and 664 corresponding to the special gift, and a descriptive text 666. In the example of FIG. 11, the four treasure box objects are displayed, and the distributor is prompted to select one of them. Text prompting such selection is displayed in the descriptive text 666.

The video image 652 is substantially the same as the video image 610 of the live-streaming room screen 608 shown on the display of the viewer's user terminal 30. The comment display region 654 is substantially the same as the comment display region 618 of the live-streaming room screen 608 displayed on the display of the viewer's user terminal 30. That is, the comment display region 654 provides the distributor with messages from the viewers of the live-stream during the period in which the selection of one of the objects corresponding to the special gift can be accepted. For example, as shown in FIG. 11, the four objects 658, 660, 662, and 664 are displayed on the distributor's live-streaming room screen 650, and while the broadcaster is wondering which one to choose, the viewers are able to send messages to the distributor through comments such as "the bottom left is better", "the top right one was winning before, so this time the right one again". In response to such messages, the distributor can say, "No, this time I'll go for the bottom right." By updating the comment display region 654 during the display of the objects, it is possible to promote interaction and communication between the viewers and the distributor.

Upon distributor's tap on one of the four treasure chest objects 658, 660, 662, and 664 on the live-streaming room screen 650 of FIG. 11, the distributor-side UI control unit 108 accepts the tapped object as the object selected by the distributor. The distributor-side communication unit 110 generates a response signal including information for identifying the tapped object or the object selected by the distributor, and transmits it to the server 10 over the NW. The gift processing unit 308 of the server 10 determines whether it corresponds to a jackpot based on the information included in the response signal. In this example, one of the four treasure chest objects is configured to correspond to the jackpot. The gift processing unit 308 determines rewards such that a greater reward is given to the distributor when it is determined to be a jackpot than when it is determined otherwise. For example, when a reward point for the special gift is set to 300 pts, a non-jackpot winning may provide a reward of 300 pts, and a jackpot winning may provide a reward of 3000 pts.

The gift processing unit 308 generates a result notification signal that includes information on the result of the determination, that is, jackpot or not, and transmits it to each of the user terminals 20 and 30 over the network NW. The distributor-side communication unit 110 of the distributor user terminal 20 receives the result notification signal, and the distributor-side UI control unit 108 obtains effect data corresponding to the jackpot from the gift effect DB 260 when the result notification signal includes information indicating the jackpot. Otherwise the distributor-side UI control unit 108 obtains effect data of an effect corresponding to the non-jackpot from the gift effect DB 260. The distributor-side UI control unit 108 displays the effect on the display based on the obtained effect data. The same steps are performed at the viewer's user terminal 30, and the effect corresponding to the determined result is displayed on the display.

Figure 12:
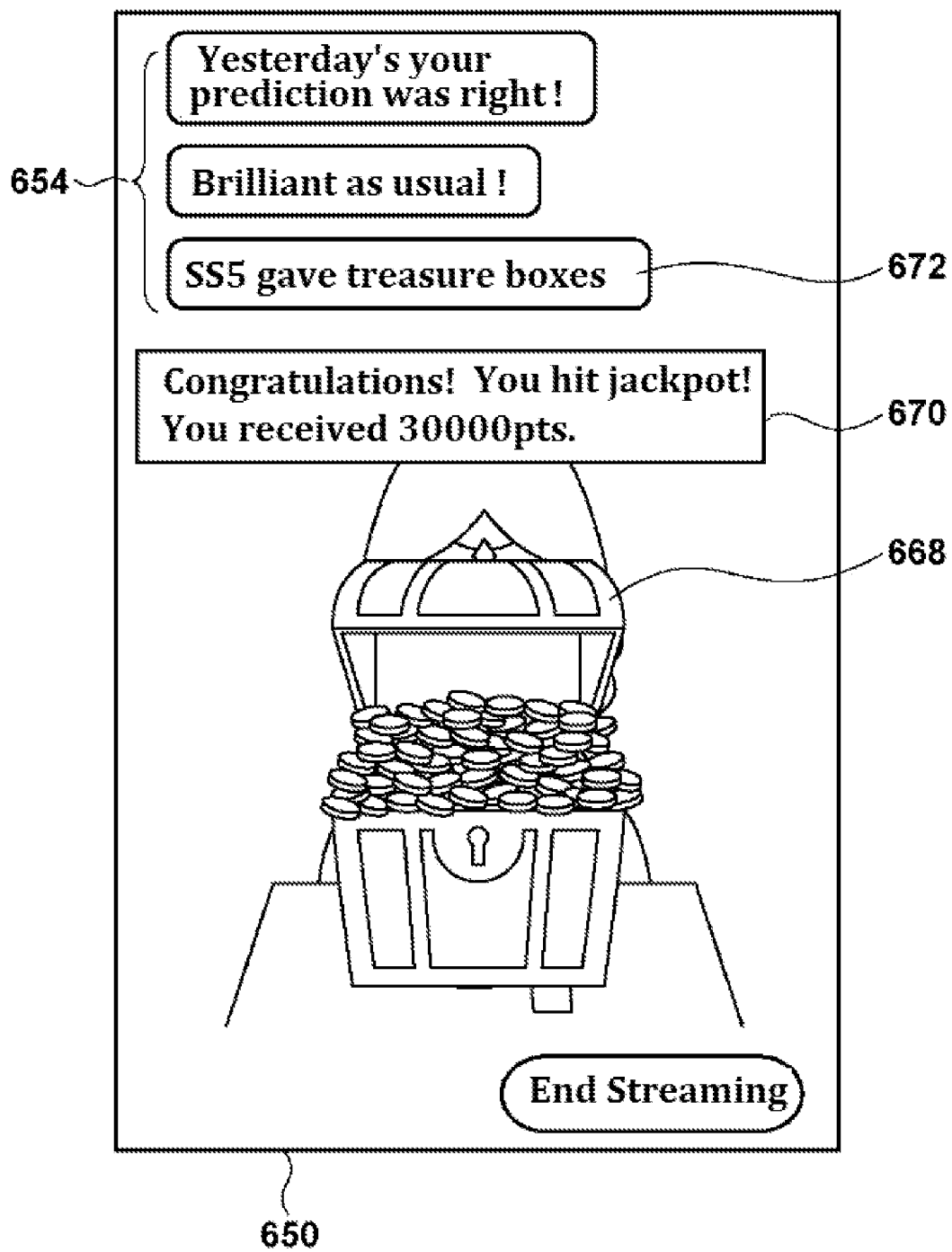
FIG. 12 is a representative screen image of a live-streaming room screen on which a jackpot effect is superimposed on the display of the distributor's user terminal.

FIG. 12 is a representative screen image of the live-streaming room screen 650 on which a jackpot effect 668 is superimposed on the display of the distributor's user terminal 20. This live-streaming room screen 650 shows, during the live-stream, a result of the amount of the reward granted to the distributor determined depending on the object that the distributor selected. The live-streaming room screen 650 includes the jackpot effect 668 and a jackpot text 670. The jackpot effect 668 is the effect corresponding to the jackpot and displayed in response to the distributor's tapping on the jackpot object on the live-streaming room screen 650 of FIG. 11. The jackpot text 670 includes text indicating that the distributor has hit the jackpot and the number of points to be awarded to the distributor. The comment display region 654 in FIG. 12 is updated to newly show a system message 672 indicating that a viewer gave the special gift to the distributor. The jackpot effect 668, the jackpot text 670, and the system message 672 are also displayed on the live-streaming room screen on the display of the viewer's user terminal 30.

Figure 13:
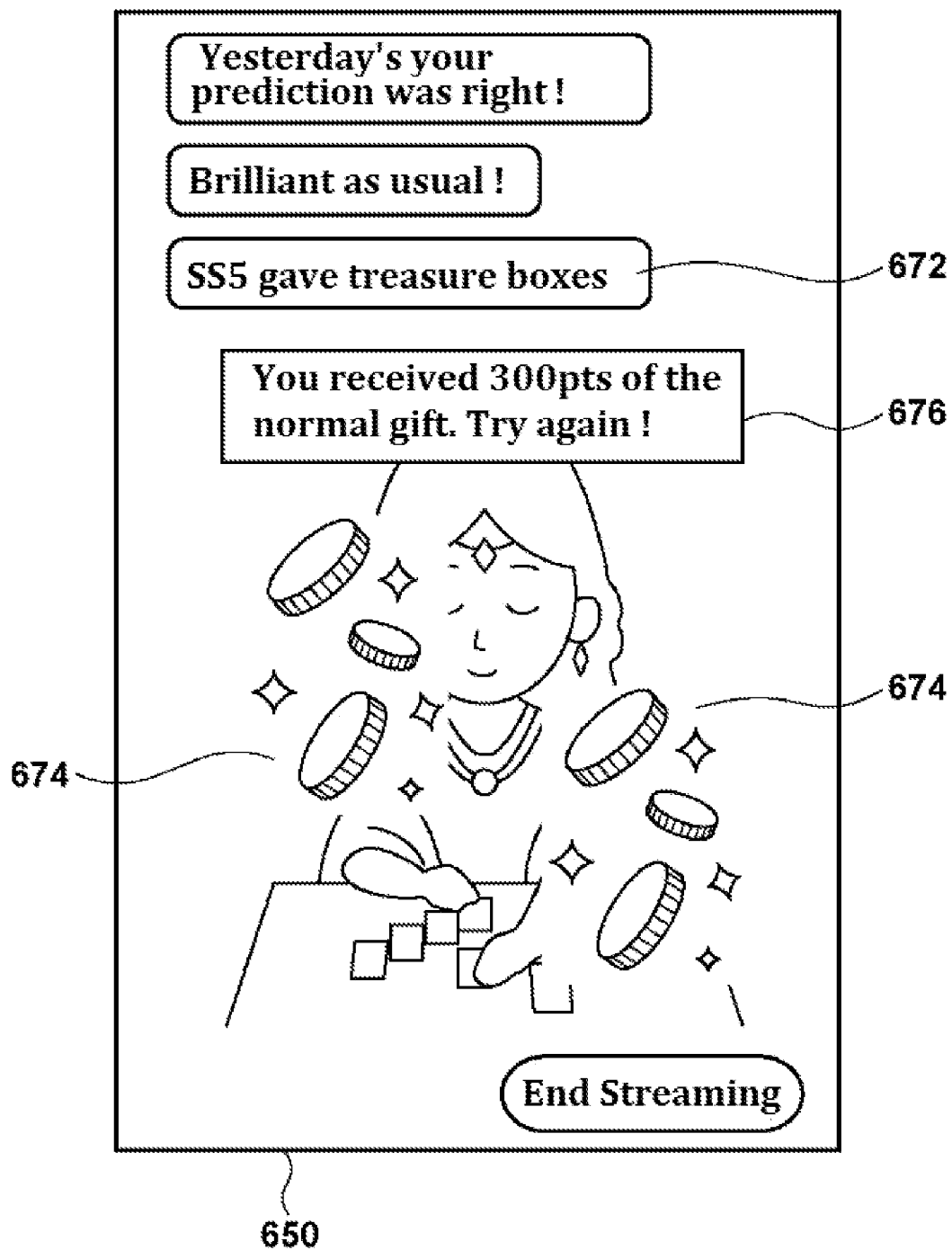
FIG. 13 is a representative screen image of a live-streaming room screen on which a non-jackpot effect is superimposed on the display of the distributor's user terminal.

FIG. 13 is a representative screen image of the live-streaming room screen 650 on which a non-jackpot effect 674 is superimposed on the display of the distributor's user terminal 20. The live-streaming room screen 650 shows, during the live-stream, the determination result of the amount of the reward granted to the distributor, which has been determined depending on the object that the distributor selected. This live-streaming room screen 650 includes the non-jackpot effect 674 and a non-jackpot text 676. The non-jackpot effect 674 is an effect corresponding to non-jackpot and displayed in response to the distributor's tapping on the object other than the jackpot object on the live-streaming room screen 650 of FIG. 11. The non-jackpot effect 674 is different from the jackpot effect 668. The non-jackpot text 676 includes text indicating that the distributor did not hit the jackpot and the number of points to be awarded to the distributor. The comment display region of FIG. 13 is similar to the comment display region 654 of FIG. 12. The non-jackpot effect 674, the non-jackpot text 676, and the system message 672 are also displayed on the live-streaming room screen on the display of the viewer's user terminal 30.

As shown in FIGS. 12 and 13, depending on which object is selected on the live-streaming room screen 650 of FIG. 11, the amount of the reward given to the distributor differs. Moreover, the effect displayed together with the text indicating the amount of the reward differs depending on the amount of the reward given to the distributor.

<Special Gift with Reward Given for Predetermined Number of Consecutive Draw Winnings>

Figure 14:
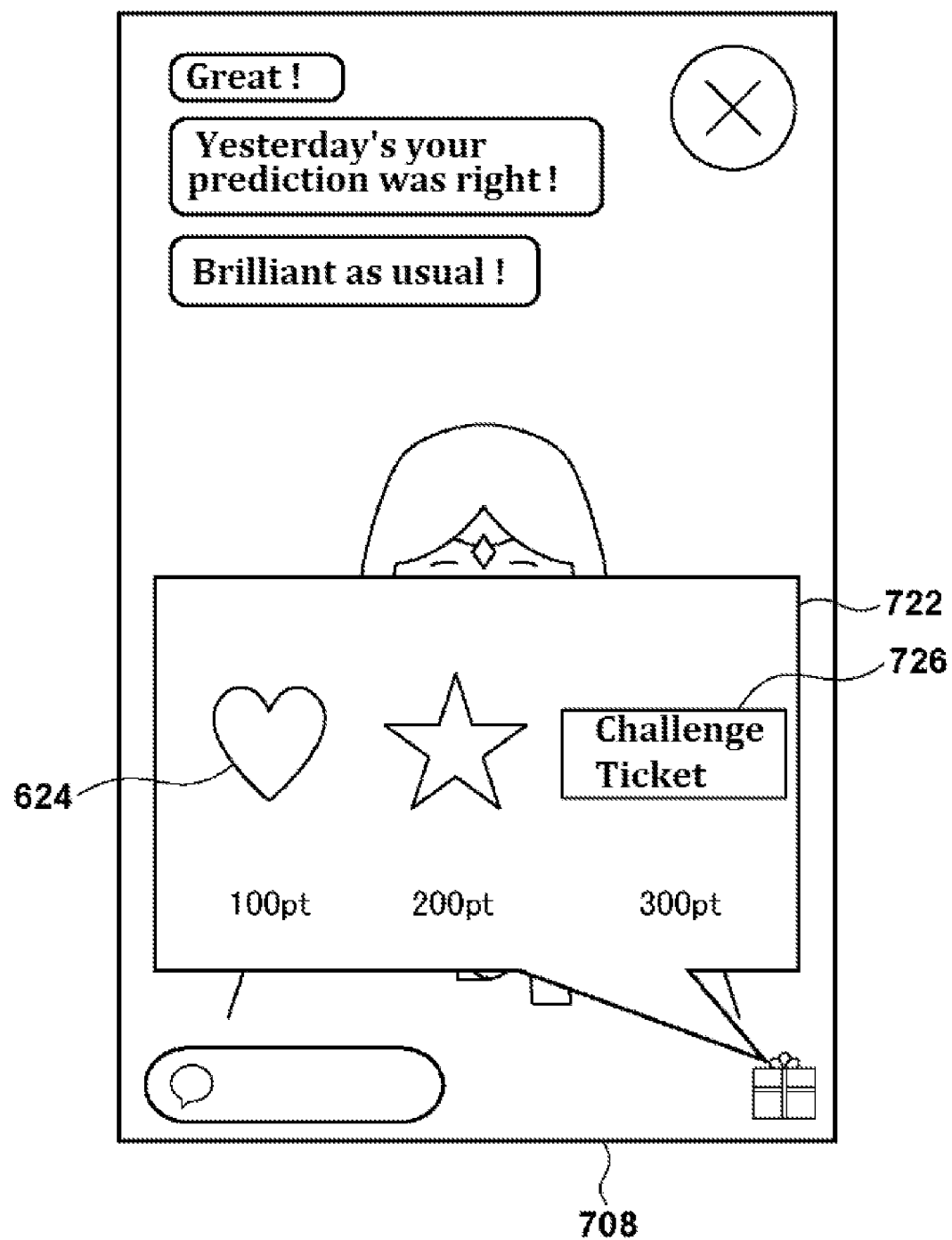
FIG. 14 is a representative screen image of a live-streaming room screen on which a gift region is superimposed on the display of the viewer's user terminal.

FIG. 14 is a representative screen image of a live-streaming room screen 708 on which a gift region 722 is superimposed on the display of the viewer's user terminal 30. The gift region 722 includes the gift object 624 of the normal gift and the gift object 726 of the special gift. Once the viewer taps the gift object 726 in the gift region 722 on the live-streaming room screen 708 of FIG. 14, the viewer-side UI control unit 202 of the user terminal 30 accepts the selection of the gift object 726 by the viewer. The viewer-side communication unit 204 generates a gift use signal including the gift ID of the special gift represented by the selected gift object 726 and transmits it to the server 10.

Figure 15:
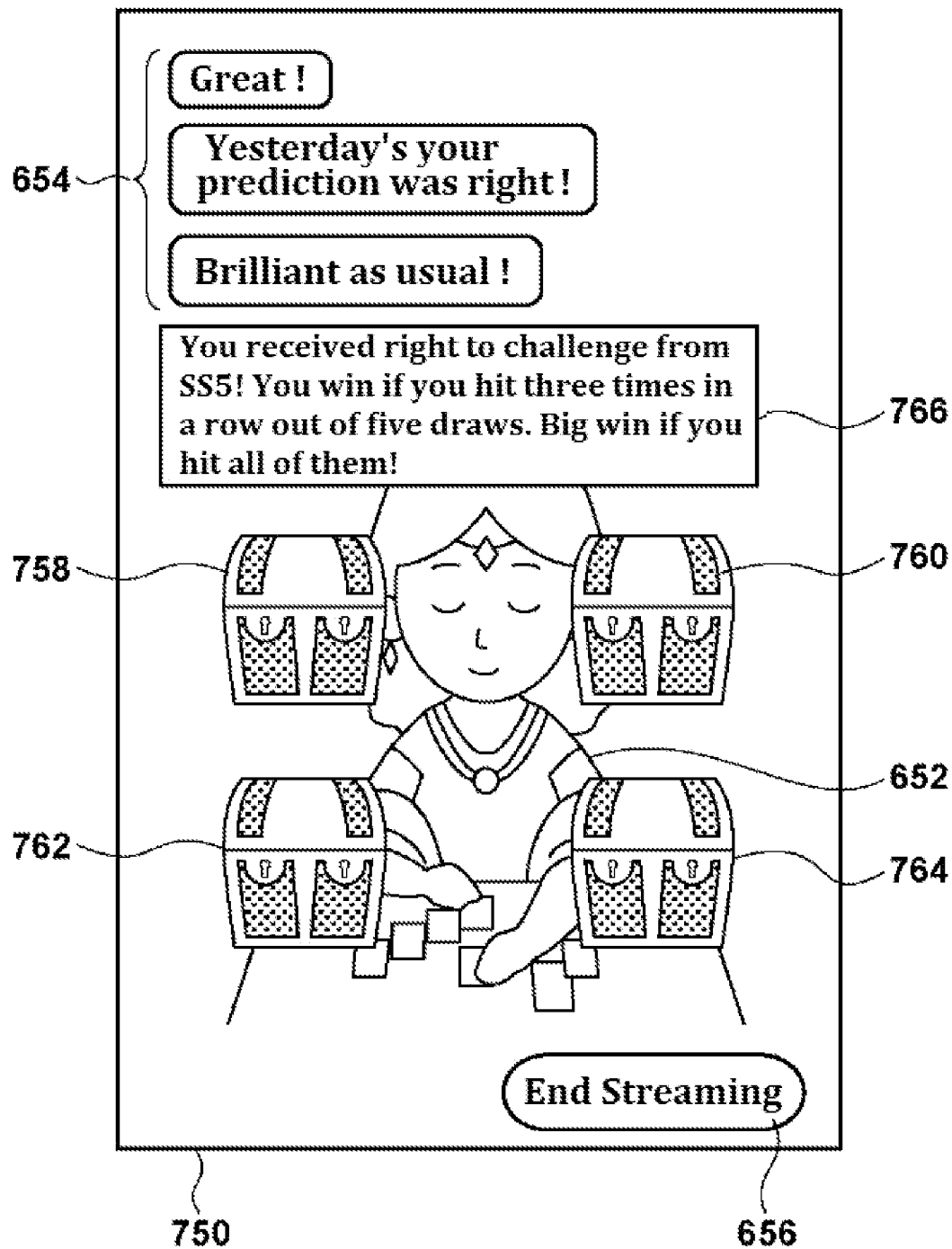
FIG. 15 is a representative screen image of a live-streaming room screen on the display of the distributor's user terminal.

FIG. 15 is a representative screen image of a live-streaming room screen 750 shown on the display of the distributor's user terminal. The live-streaming room screen 750 is configured to accept the distributor's selection of one of four objects 758, 760, 762, and 764 associated with the special gift, when the special gift is used for the distributor.

In response to the gift use signal transmitted with reference to FIG. 14, the distributor-side communication unit 110 of the distributor's user terminal 20 receives the request signal from the server 10 over the network NW. The distributor-side UI control unit 108 superimposes on the live-streaming room screen a plurality of objects corresponding to the special gift identified by the gift ID included in the received request signal. The live-streaming room screen 750 of FIG. 15 includes a video image 652 of the distributor obtained by reproducing the video data on the distributor's user terminal 20, s comment display region 654, a streaming end button 656, the plurality of objects 758, 760, 762, and 764 corresponding to the special gift, and a descriptive text 766. In the example of FIG. 15, the four treasure box objects are displayed, and the distributor is prompted to select one of them. Text prompting such selection and text indicating the content of a challenge are displayed in the descriptive text 766.

Similarly to the example of FIG. 11, by updating the comment display region 654 during the display of the objects, it is possible to promote interaction and communication between the viewers and the distributor.

Upon distributor's tap on one of the four treasure chest objects 758, 760, 762, and 764 on the live-streaming room screen 750 of FIG. 15, the distributor-side UI control unit 108 accepts the tapped object as the object selected by the distributor. The distributor-side communication unit 110 generates a response signal including information for identifying the tapped object or the object selected by the distributor, and transmits it to the server 10 over the NW. The gift processing unit 308 of the server 10 determines whether it corresponds to a win or lose based on the information included in the response signal. In this example, one of the four treasure chest objects is configured to correspond to winning the lottery and the rest of them correspond to losing the lottery.

The gift processing unit 308 increments the number of consecutive wins by one when it is determined that the distributor's selection corresponds to winning. The initial value of the number of consecutive wins is 0. Whereas when it is determined that the selection corresponds to losing or when the number of consecutive wins reaches a predetermined upper limit, the gift processing unit 308 determines the reward such that the larger the number of consecutive wins, the more reward is given to the distributor. For example, when the reward point for the special gift is 300 pts, the reward may be 0 (zero) for up to two consecutive wins, 3000 pts for three consecutive wins, 5000 pts for four consecutive wins, and 10,000 pts for five consecutive wins.

The gift processing unit 308 generates a result notification signal that includes information on the result of the determination and transmits it to each of the user terminals 20 and 30 over the network NW. As a result of the determination by the gift processing unit 308, one of the following states occurs, and the result notification signal includes specifying information for specifying the occurred state.

State 1: It is determined that the selection corresponds to winning and the number of consecutive wins after the increment has not reached the predetermined number. In this case, the result notification signal includes the number of consecutive wins, and the signal also serves as a request signal for requesting the next input from the distributor.

State 2: It is determined that the selection corresponds to winning and the number of consecutive wins after the increment has reached the predetermined number.

State 3: It is determined that the selection corresponds to losing. In this case, the result notification signal includes a reward given to the distributor (the reward=0 means that no reward is given).

The distributor-side communication unit 110 of the distributor user terminal 20 receives the result notification signal, and the distributor-side UI control unit 108 obtains, from the gift effect DB 260, an effect data of the effect corresponding to the state specified by the specifying information included in the signal. The distributor-side UI control unit 108 displays the effect on the display based on the obtained effect data. The same steps are performed at the viewer's user terminal 30, and the effect corresponding to the determined result is displayed on the display.

Figure 16:
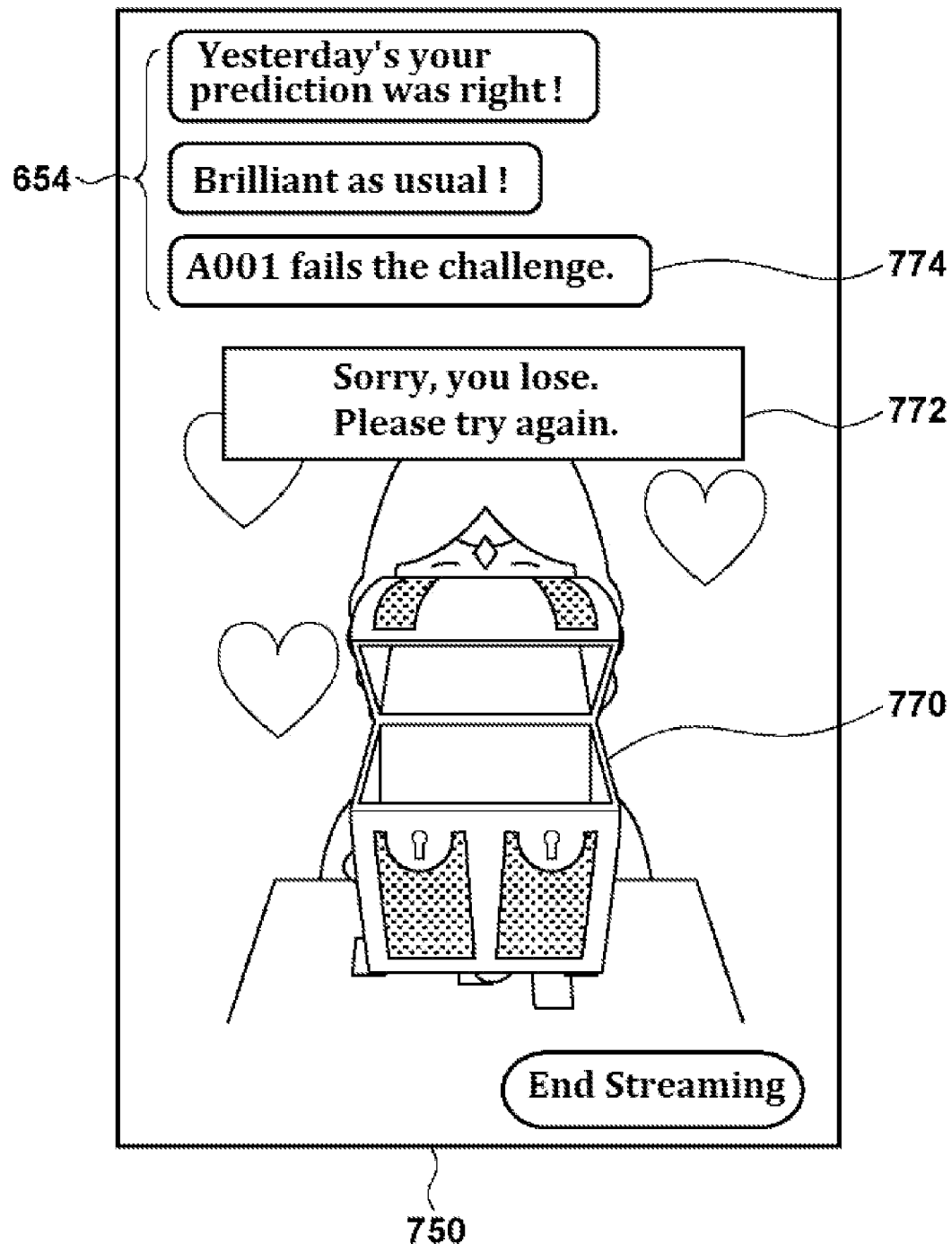
FIG. 16 is a representative screen image of a live-streaming room screen on which a losing and no-reward effect is superimposed on the display of the distributor's user terminal.

FIG. 16 is a representative screen image of the live-streaming room screen 750 on which a losing and no-reward effect 770 is superimposed on the display of the distributor's user terminal 20. The live-streaming room screen 750 shows, during the live-stream, the result of the determination whether to give the reward to the distributor, which has been determined depending on the object that the user selected. The live-streaming room screen 750 includes the losing and no-reward effect 770 and a losing and no-reward text 772. The losing and no-reward effect 770 is an effect corresponding to State 3 and no-reward. The losing and no-reward text 772 includes text indicating that the distributor drew the losing object and no reward is given. The comment display region 654 of FIG. 16 is updated to newly show the system message 774 indicating that the viewer gave the special gift to the distributor, however the distributor drew the losing object. The losing and no-reward effect 770, the losing and no-reward text 772, and the system message 774 are also displayed on the live-streaming room screen on the display of the viewer's user terminal 30. The distributor-side UI control unit 108 stops accepting selection of objects by stopping display of the plurality of selectable objects on the live-streaming room screen 750 of FIG. 16.

Figure 17:
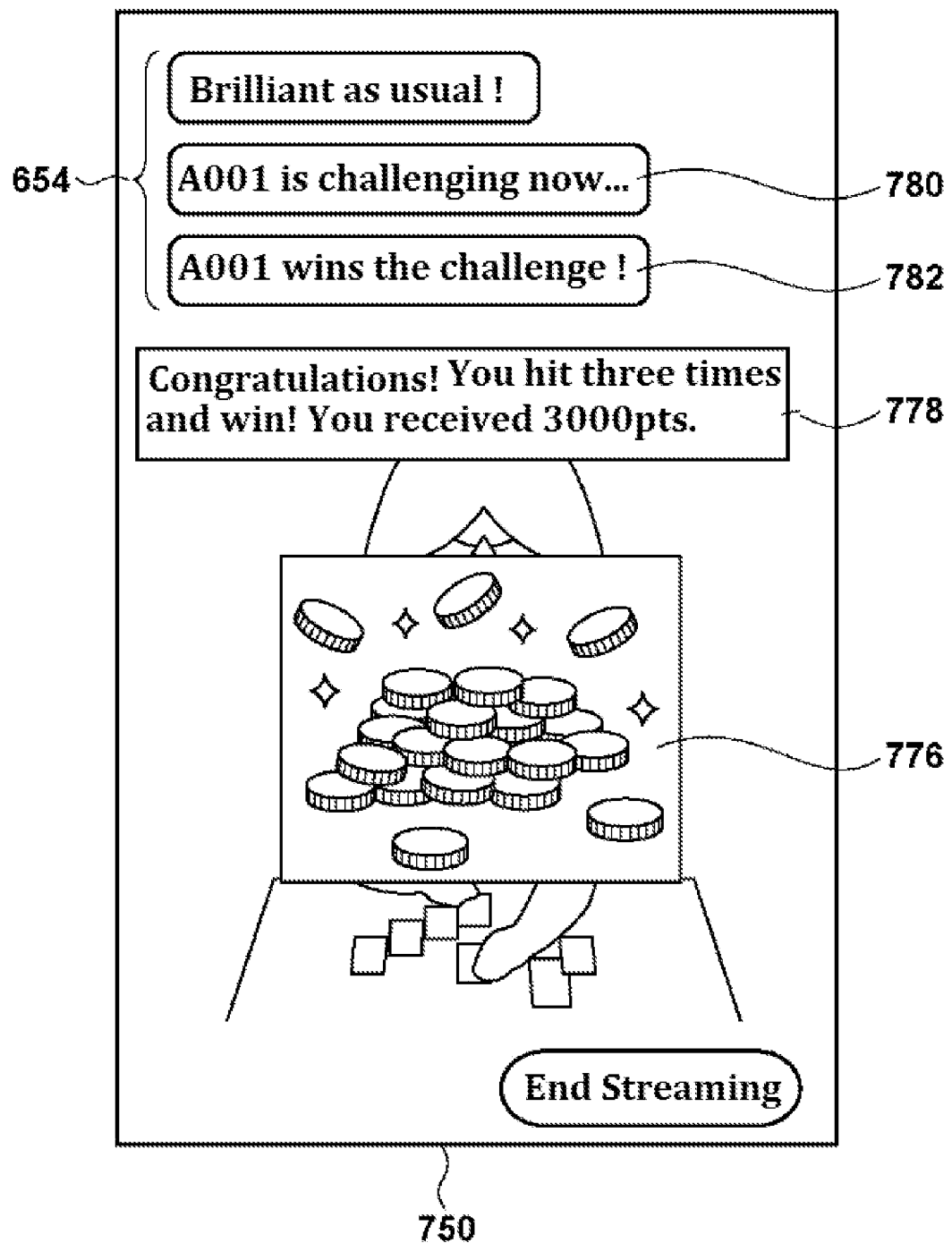
FIG. 17 is a representative screen image of a live-streaming room screen on which a losing but reward-given effect is superimposed on the display of the distributor's user terminal.

FIG. 17 is a representative screen image of the live-streaming room screen 750 on which a losing but reward-given effect 776 is superimposed on the display of the distributor's user terminal 20. The live-streaming room screen 750 shows, during the live-stream, the result of the determination whether to give the reward to the distributor and the determined result for the amount of the reward granted to the distributor, which have been determined depending on the object that distributor selected. The live-streaming room screen 750 includes the losing but reward-given effect 776 and a losing but reward-given text 778. The losing but reward-given effect 776 is an effect corresponding to State 3 and reward granted. The losing but reward-given text 778 includes text indicating the number of wins (that is, consecutive wins) the distributor had before drawing the losing object and the amount of reward granted. The comment display region 654 of FIG. 17 is updated to newly show a system message 780 indicating that the viewer gave the special gift to the distributor, and a system message 782 indicating that the distributor obtains a reward associated with the special gift. The losing but reward-given effect 776, the losing but reward-given text 778, and the system messages 780 and 782 are also displayed on the live-streaming room screen on the display of the viewer's user terminal 30. The distributor-side UI control unit 108 stops accepting selection of objects by stopping display of the plurality of selectable objects on the live-streaming room screen 750 of FIG. 17.

Figure 18:
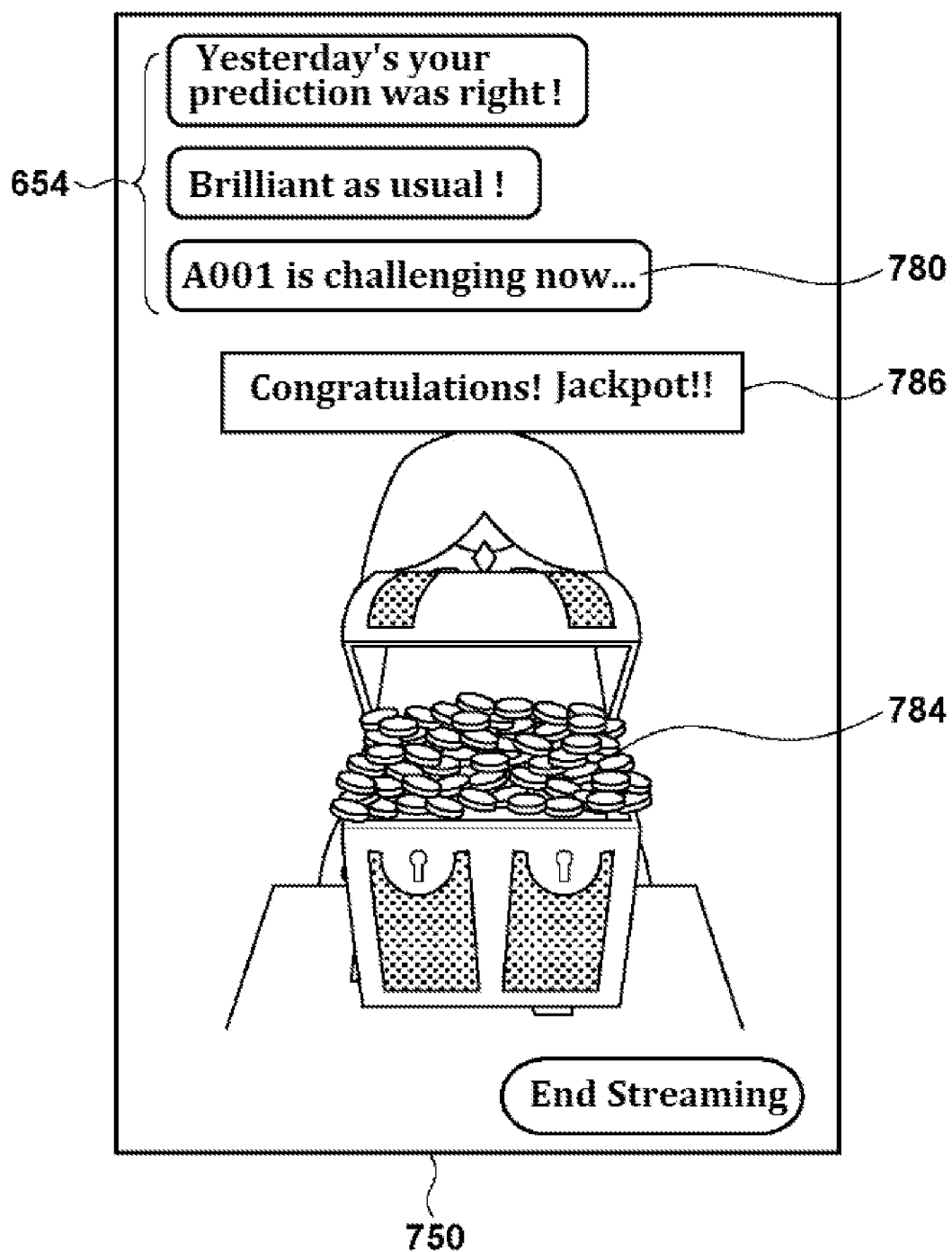
FIG. 18 is a representative screen image of a live-streaming room screen on which a winning effect is superimposed on the display of the distributor's user terminal.

FIG. 18 is a representative screen image of the live-streaming room screen 750 on which a winning effect 784 is superimposed on the display of the distributor's user terminal 20. The live-streaming room screen 750 shows, during the live-stream, a result of determining whether it is a win or lose depending on the object that the distributor selected. The live-streaming room screen 750 includes the winning effect 784 and a winning text 786. The winning effect 784 is an effect corresponding to State 1. The winning text 786 includes text indicating that the distributor drew the winning object. The comment display region 654 in FIG. 18 is updated to newly show a system message 780 indicating that a viewer gave the special gift to the distributor. The winning effect 784, the winning text 786, and the system message 780 are also displayed on the live-streaming room screen on the display of the viewer's user terminal 30.

Figure 19:
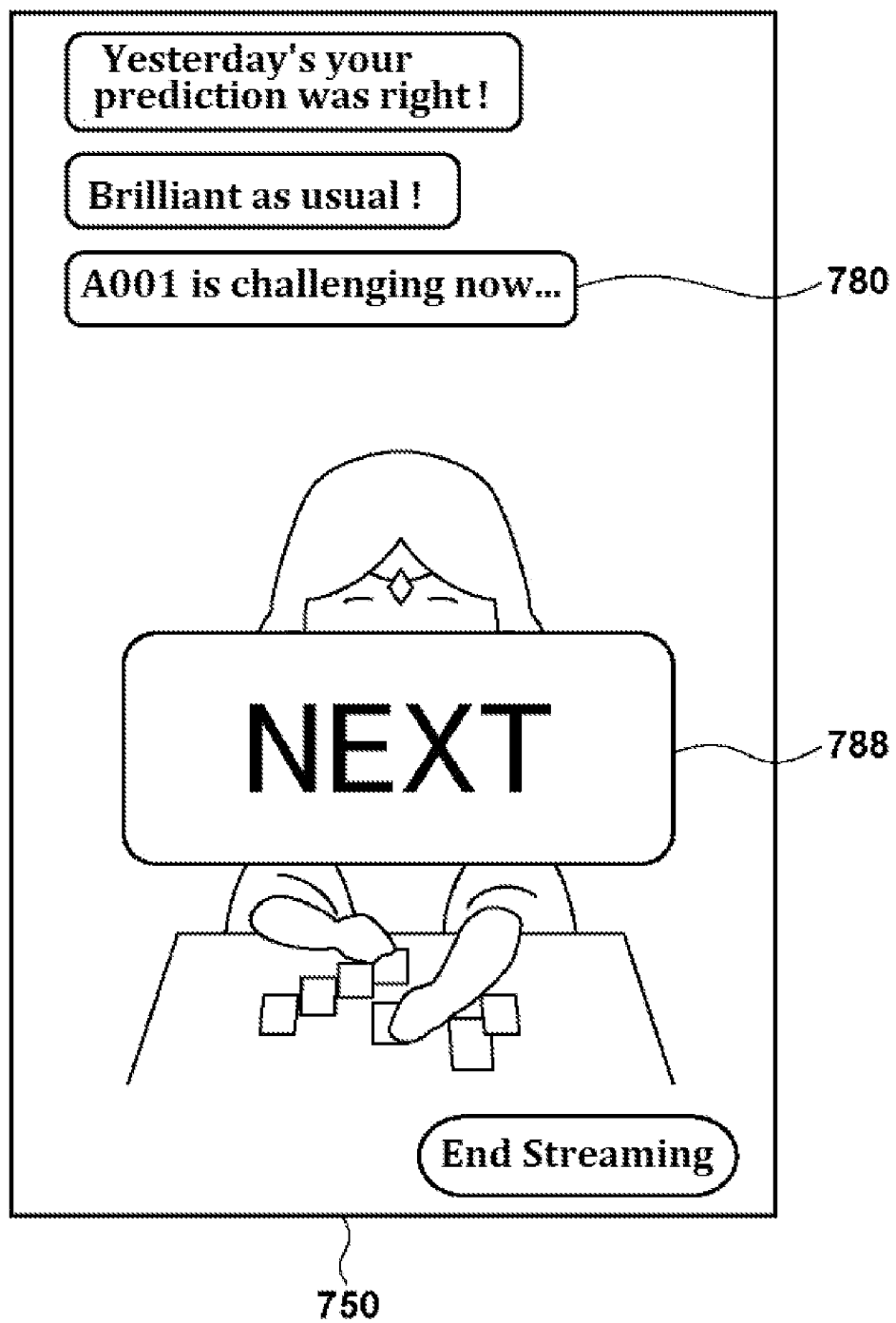
FIG. 19 is a representative screen image of a live-streaming room screen on which a next object is superimposed on the display of the distributor's user terminal.

FIG. 19 is a representative screen image of the live-streaming room screen 750 on which a next object 788 is superimposed on the display of the distributor's user terminal 20. Once the viewer taps the screen of the live-stream selection screen 750 of FIG. 18, the live-streaming room screen 750 of FIG. 19 is shown. The live-streaming room screen 750 of FIG. 19 indicates to the distributor that the next inning or round is about to start by displaying the next object 788 and the system message 780.

Figure 20:
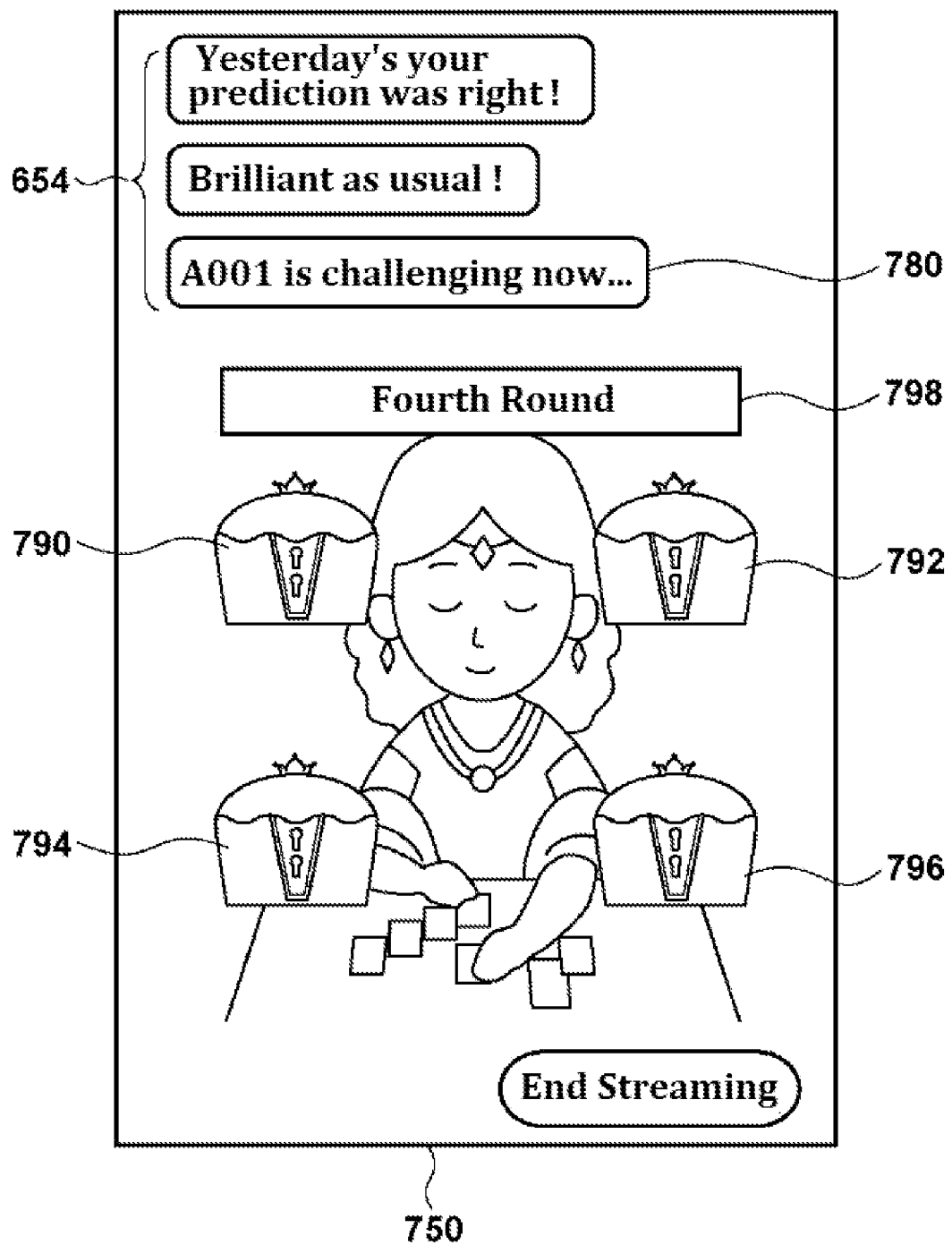
FIG. 20 is a representative screen image of a live-streaming room screen on the display of the distributor's user terminal.

FIG. 20 is a representative screen image of the live-streaming room screen 750 shown on the display of the distributor's user terminal 20. Once the viewer taps the screen of the live-stream selection screen 750 of FIG. 19, the live-streaming room screen 750 of FIG. 20 is shown. This live-streaming room screen 750 is configured to display four new objects 790, 792, 794, and 796 when the distributor drew the winning object in the previous round on the live-streaming room screen 750 of FIG. 15, and configured to accept distributor's selection of one of the four new objects.

The live-streaming room screen 750 of FIG. 18 is displayed in response to reception, by the distributor's user terminal 20, of the result notification signal that includes the specifying information that specifies State 1. The distributor's user terminal 20 is configured to accept such a result notification signal as a request signal. The distributor-side UI control unit 108 superimposes, on the live-streaming room screen, a plurality of objects 790, 792, 794, and 796 corresponding to the special gift identified by the gift ID included in the received request signal and corresponding to the number of consecutive wins. The live-streaming room screen 750 in FIG. 20 includes the new four treasure chest objects 790, 792, 794, and 796 which are different from the four treasure chest objects 758, 760, 762, and 764 of FIG. 15 and a descriptive text 798. The distributor is prompted to select one of these four treasure chest objects 790, 792, 794, and 796. The descriptive object 798 shows text indicating how many more wins are required to achieve the predetermined number of consecutive wins. Also in the live-streaming room screen 750 of FIG. 20, it is possible to promote interaction and communication between the viewers and the distributor by updating the comment display region 654 during the display of the objects. For example, a viewer may post a comment praising the distributor for his/her luck in draw, or a viewer may post his/her predictions for the next win and the distributor may read the post and say something about it. Communication between the viewers and the distributor can be made in this way. On the live-streaming room screen 750 of FIG. 20, in response to the distributor's tap on one of the four treasure chest objects 790, 792, 794, and 796, the process similar to that described with reference to FIG. 15 is performed. The round of object selection is repeated until the distributor draws a losing object or the number of consecutive wins reaches the predetermined number.

Figure 21:
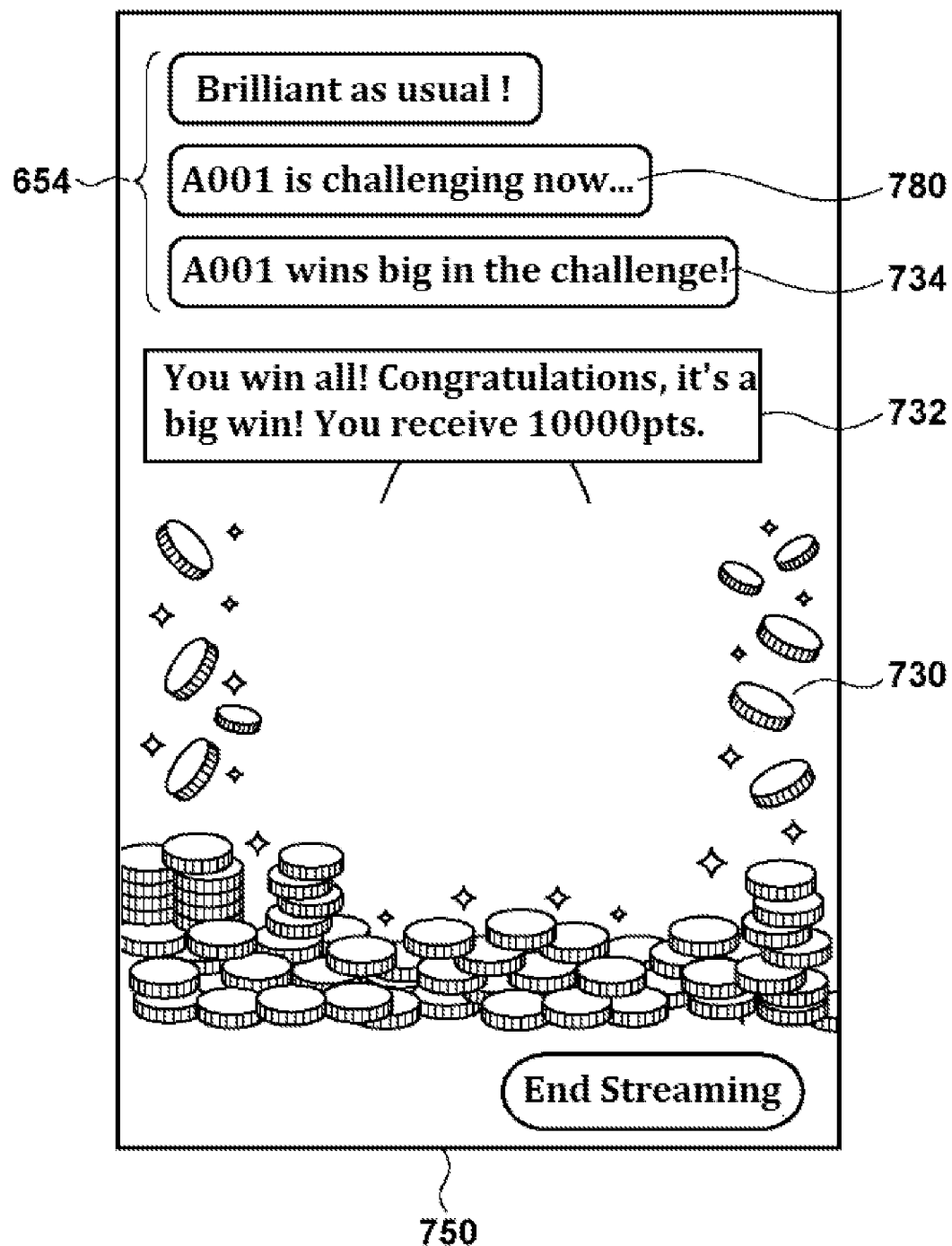
FIG. 21 is a representative screen image of a live-streaming room screen on which a big winning effect is superimposed on the display of the distributor's user terminal.

FIG. 21 is a representative screen image of the live-streaming room screen 750 on which a big winning effect 730 is superimposed on the display of the distributor's user terminal 20. The live-streaming room screen 750 shows, during the live-stream, the result of the determination whether to give the reward to the distributor and the determined result for the amount of the reward granted to the distributor, which have been determined depending on the object that distributor selected. The live-streaming room screen 750 includes a big winning effect 730 and a big winning text 732. The big winning effect 730 is an effect corresponding to State 2. The big wining effect 730 differs from the losing but reward-given effect 776 in that it appears larger, longer in duration, or more luxurious. The big win text 732 includes text indicating that the number of consecutive wins has reached the predetermined number, that is, the distributor has drawn winning objects in all his/her selections. The text further includes the amount of reward to be granted. The comment display region 654 of FIG. 21 is updated to newly show the system message 780 indicating that the viewer gave the special gift to the distributor, and a system message 734 indicating that the distributor has drawn winning objects in all his/her selections. The big winning effect 730, the big winning text 732, and the system messages 780 and 734 are also displayed on the live-streaming room screen on the display of the viewer's user terminal 30.

In this way, the distributor-side UI control unit 108 of the distributor's user terminal 20 displays, on the display, the results of determinations depending on the contents of the accepted multiple inputs. The number of consecutive wins is determined by the distributor's multiple object selections, and whether a reward is given to the distributor and the amount of the reward are determined depending on the determined number of consecutive wins.

<High and Low Type Special Gift>

Figure 22:
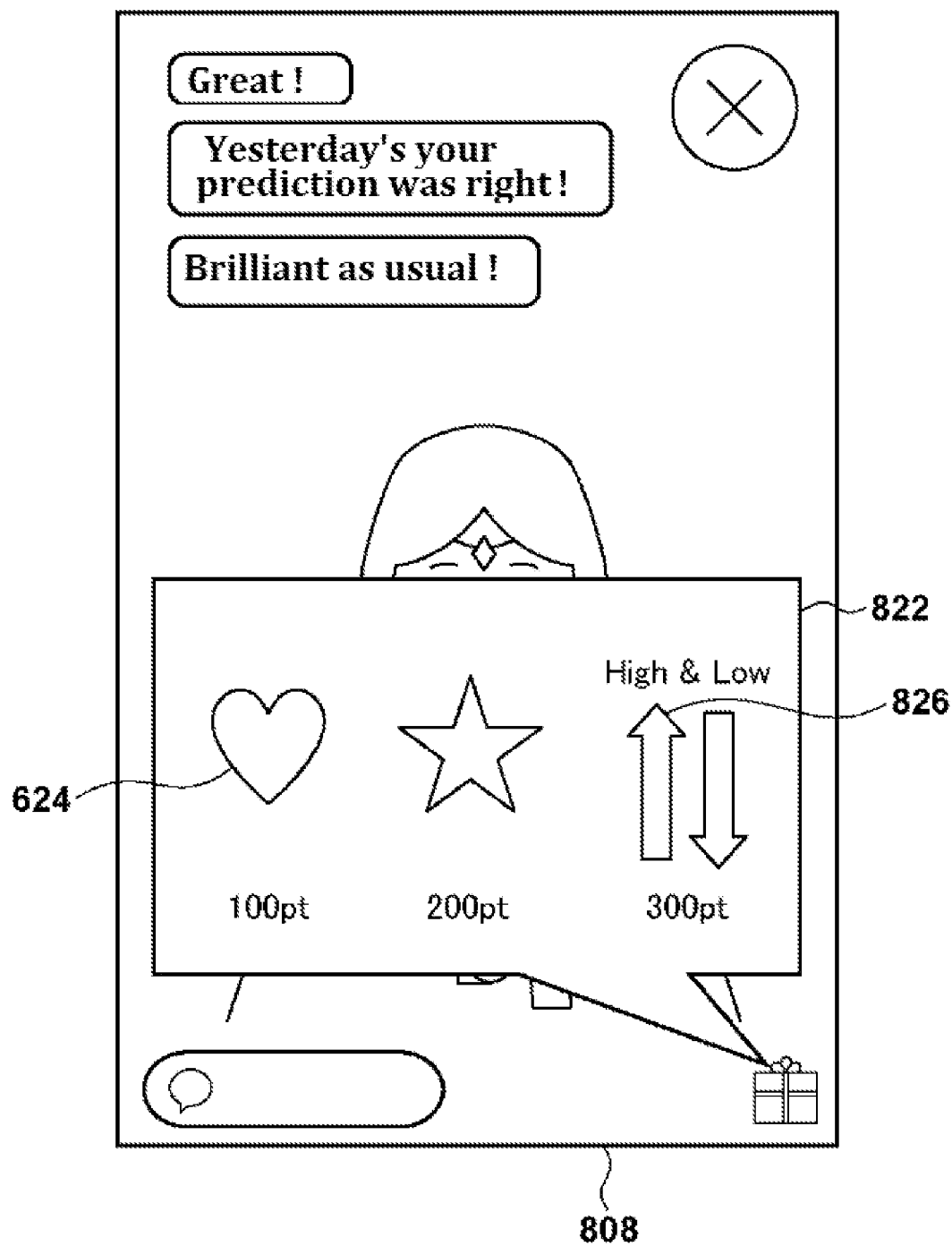
FIG. 22 is a representative screen image of a live-streaming room screen on which a gift region is superimposed on the display of the viewer's user terminal.

FIG. 22 is a representative screen image of a live-streaming room screen 808 on which a gift region 822 is superimposed on the display of the viewer's user terminal 30. The gift region 822 includes the gift object 624 of the normal gift and the gift object 826 of the special gift. Once the viewer taps the gift object 826 in the gift region 822 on the live-streaming room screen 808 of FIG. 22, the viewer-side UI control unit 202 of the user terminal 30 accepts the selection of the gift object 826 by the viewer. The viewer-side communication unit 204 generates a gift use signal including the gift ID of the special gift represented by the selected gift object 826 and transmits it to the server 10.

Figure 23:
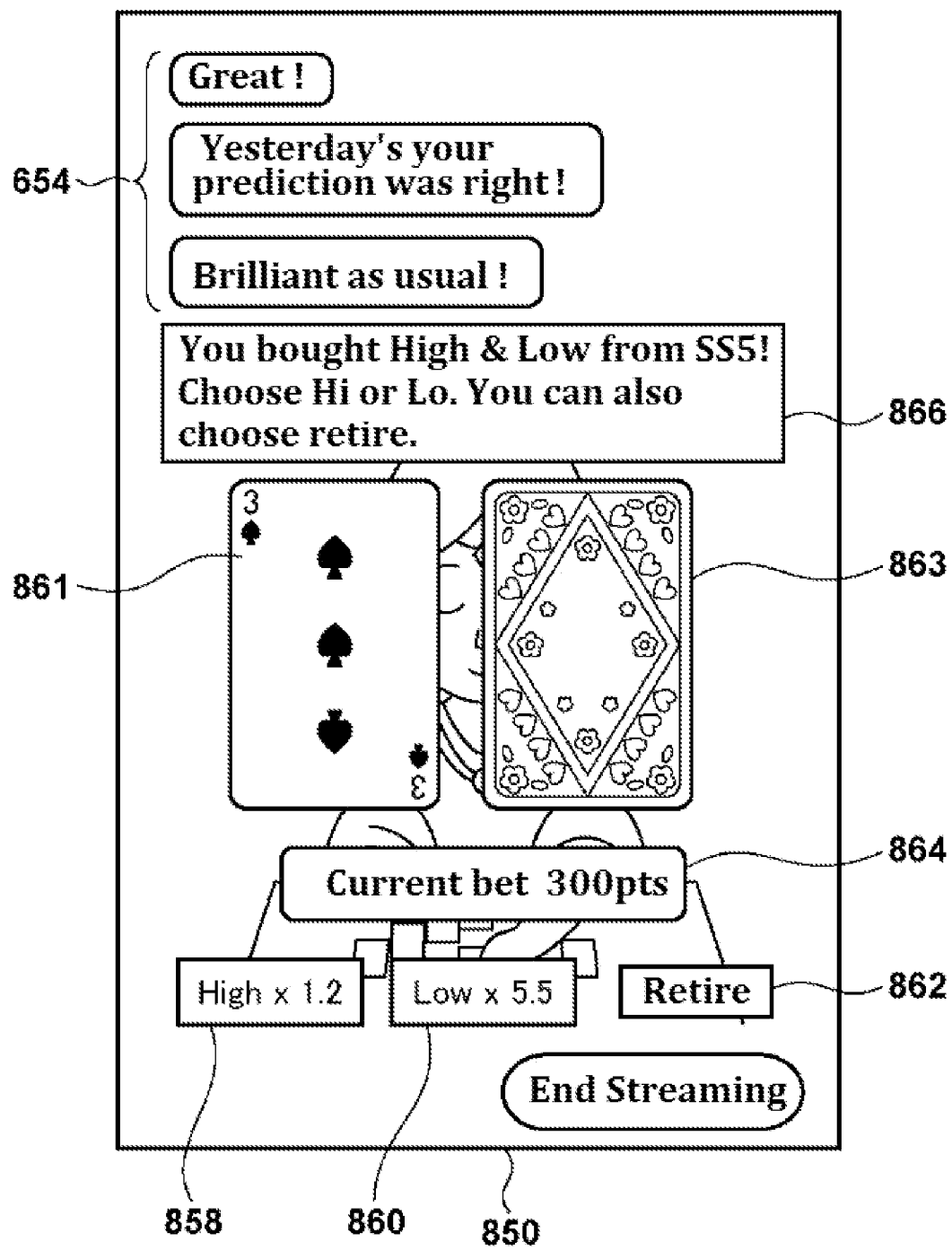
FIG. 23 is a representative screen image of a live-streaming room screen on the display of the distributor's user terminal.

FIG. 23 is a representative screen image of a live-streaming room screen 850 shown on the display of the distributor's user terminal. The live-streaming room screen 850 is configured to accept the distributor's selection of one of three objects 850, 860, and 862 associated with the special gift, when the special gift is used for the distributor.

In response to the gift use signal transmitted with reference to FIG. 22, the distributor-side communication unit 110 of the distributor's user terminal 20 receives the request signal from the server 10 over the network NW. The distributor-side UI control unit 108 superimposes on the live-streaming room screen a plurality of objects corresponding to the special gift identified by the gift ID included in the received request signal. The live-streaming room screen 850 of FIG. 23 includes a comment display region 654, a plurality of objects 858, 860, and 862 corresponding to the special gifts, a descriptive text 866, a status display area 864, and a card object 861 faced up and card object 863 faced down for a high and low game. In the example of FIG. 23, displayed are the object 858 for choosing Hi (higher) in the high and low game, the object 860 for choosing Lo (lower) in the high and low game, and the object 862 for choosing retire from the game. Each of the Hi object 858 and the Lo object 860 shows the odds (multiplier) applied thereto when winning by selecting the object, which is a choice the distributor makes in the game. The descriptive text 866 includes text prompting the distributor to choose one of these three objects and text indicating the giver of the special gift. A status display region 864 displays the amount of points the distributor is currently betting. The initial value of the points bet by the distributor may be set to a value corresponding to the price points of the special gift given by the viewer.

Similarly to the example of FIG. 11, by updating the comment display region 654 during the display of the objects, it is possible to promote interaction and communication between the viewers and the distributor.

Upon distributor's tap on one of the three choice objects 858, 860, and 862 on the live-streaming room screen 750 of FIG. 23, the distributor-side UI control unit 108 accepts the tapped object as the object selected by the distributor. The distributor-side communication unit 110 generates a response signal including information for identifying the tapped object or the object selected by the distributor, and transmits it to the server 10 over the NW. The gift processing unit 308 of the server 10 determines whether it corresponds to winning or retirement based on the information included in the response signal. In this example, when the card object 863 first face down is turned to face up and the number appeared on the card is larger than the number on the card object 861 face up, Hi is win. Whereas when the number is the same or smaller, Lo is win. The gift processing unit 308 determines that the distributor wins when the distributor chooses the right one between Hi and Lo, and otherwise determines that the distributor loses. When the retire is selected, the gift processing unit 308 gives the points bet by the distributor at that time as a reward to the distributor, and ends the process related to the special gift.

When the gift processing unit 308 determines that it is a win, the gift processing unit 308 multiplies the points bet by the distributor by the multiplier defined in the distributor's choice (Hi or Lo), and so the points bet by the distributor are increased. For example, when the betting point is 300 and the distributor chose Hi to win with a multiplier of 1.2, the distributor's points will be increased to 300×1.2=360. Whereas when the gift processing unit 308 determines that it is a lose, the gift processing unit 308 terminates the process related to the special gift without giving the reward to the distributor.

The gift processing unit 308 generates a result notification signal that includes information on the result of the determination and transmits it to each of the user terminals 20 and 30 over the network NW. The result notification signal includes information indicating whether it is a win or lose, and the updated amount of points bet by the distributor in the case of the win.

The distributor-side communication unit 110 of the distributor user terminal 20 receives the result notification signal, and the distributor-side UI control unit 108 obtains, from the gift effect DB 260, an effect data of the effect corresponding to the state specified by the specifying information included in the signal. The distributor-side UI control unit 108 displays the effect on the display based on the obtained effect data. The same steps are performed at the viewer's user terminal 30, and the effect corresponding to the determined result is displayed on the display.

Figure 24:
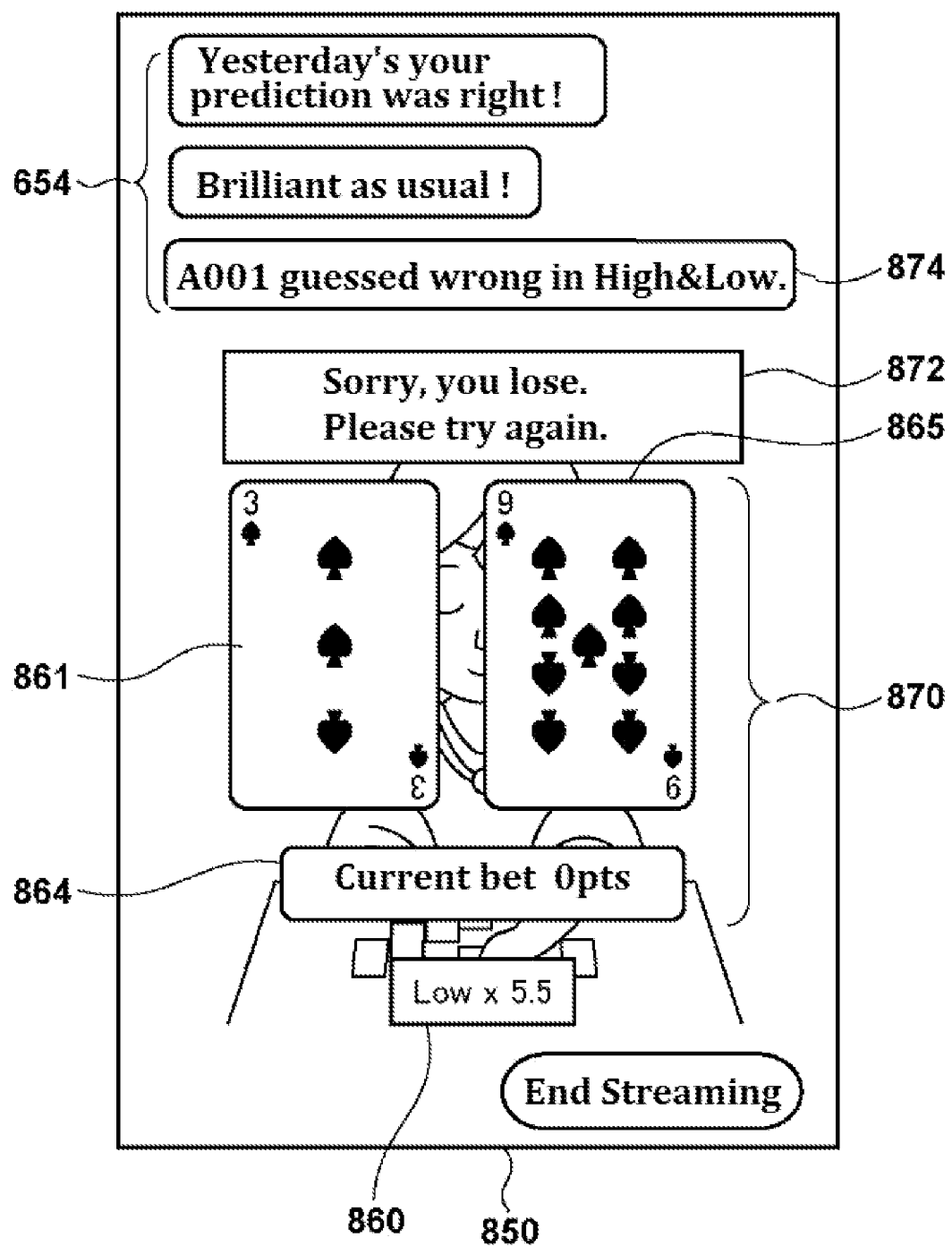
FIG. 24 is a representative screen image of a live-streaming room screen on which a losing effect is superimposed on the display of the distributor's user terminal.

FIG. 24 is a representative screen image of the live-streaming room screen 850 on which a losing effect 870 is superimposed on the display of the distributor's user terminal 20. The live-streaming room screen 850 shows, during the live-stream, the result of determining whether to give the reward to the distributor, which has been determined depending on the object that the user selected. In particular, the live-streaming room screen 850 of FIG. 24 corresponds to the case where the result notification signal indicates a lose. This live-streaming room screen 850 includes the losing effect 870, a losing text 872, and the Lo object 860, which is the object chosen by the distributor in FIG. 23. The objects 858 and 862 for the other options that were unchosen are not shown in the live-streaming room screen 850 of FIG. 24. The losing effect 870 includes the face-up card object 861 identical to the one shown on the live-distribution room screen 850 of FIG. 23, a face-up card object 865 that corresponds to the card object 863 face down, and the status display area 864. The status display area 864 includes text indicating that the points bet by the distributor becomes zero as a result of the determination of lose. The losing text 872 includes text indicating that the distributor's guess was wrong and no reward is given. The comment display region 654 of FIG. 24 is updated to newly show a system message 874 indicating that the viewer gave the special gift to the distributor, however the distributor guessed wrong in the game. The losing effect 870, the losing text 872, and the system message 874 are also displayed on the live-streaming room screen on the display of the viewer's user terminal 30. The distributor-side UI control unit 108 stops accepting selection of objects by stopping display of the plurality of selectable objects on the live-streaming room screen 850 of FIG. 24.

Figure 25:
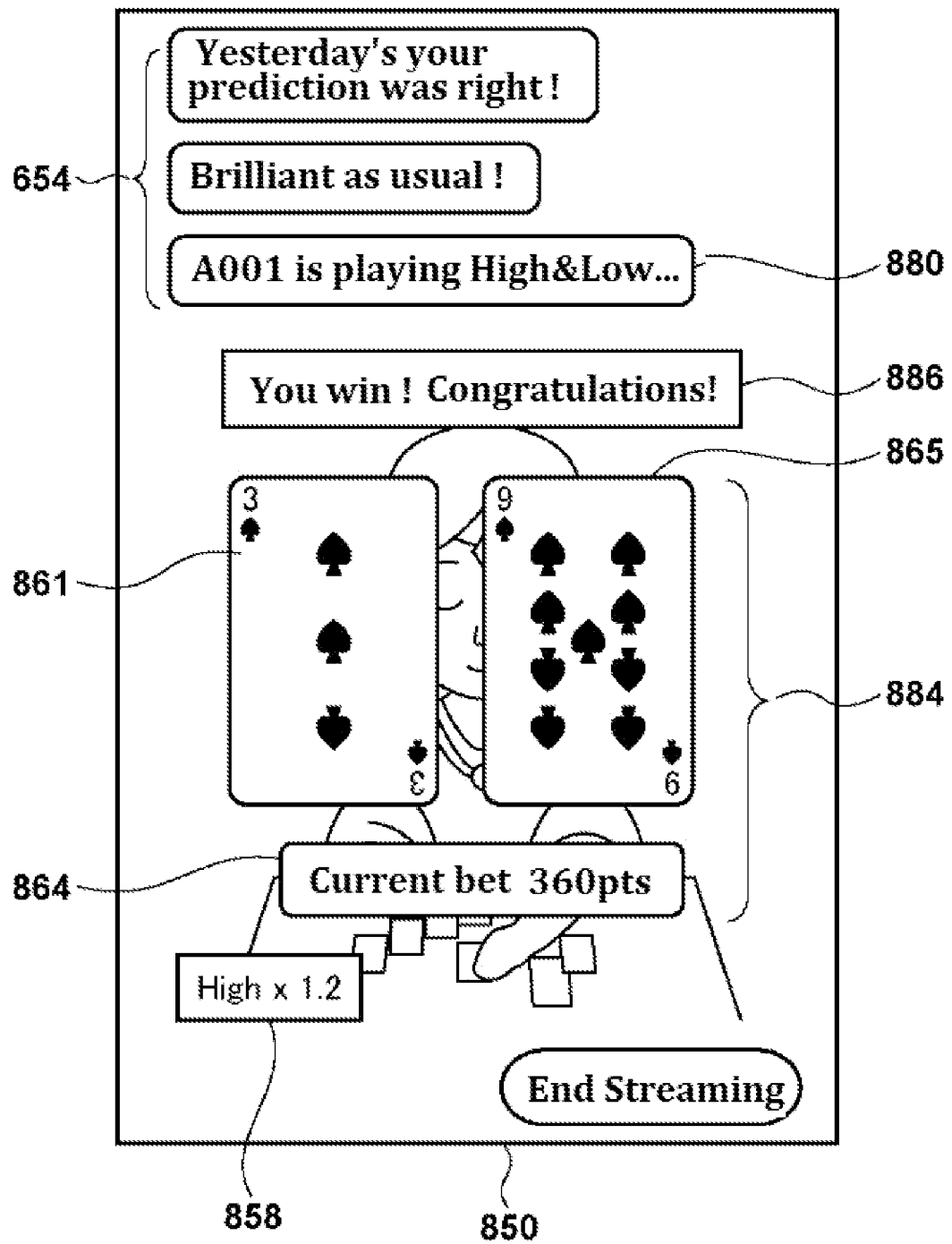
FIG. 25 is a representative screen image of a live-streaming room screen on which a winning effect is superimposed on the display of the distributor's user terminal.

FIG. 25 is a representative screen image of the live-streaming room screen 850 on which a winning effect 884 is superimposed on the display of the distributor's user terminal 20. The live-streaming room screen 850 shows, during the live-stream, a result of determining whether it is winning or losing depending on the object that the distributor selected. In particular, the live-streaming room screen 850 of FIG. 25 corresponds to the case where the result notification signal indicates a win. This live-streaming room screen 850 includes the winning effect 884, a winning text 886, and the Hi object 858, which is the object chosen by the distributor in FIG. 23. The objects 860 and 862 for the other options that were unchosen are not shown in the live-streaming room screen 850 of FIG. 25. The winning effect 884 includes the face-up card object 861 identical to the one shown on the live-distribution room screen 850 of FIG. 23, the face-up card object 865 that corresponds to the card object 863 face down, and the status display area 864. The status display area 864 includes text indicating that the current points bet by the distributor that has been increased as a result of the determination of win. The winning text 886 includes text indicating that the distributor's guess was right. The comment display region 654 in FIG. 25 is updated to newly show a system message 880 indicating that a viewer gave the special gift to the distributor. The winning effect 884, the winning text 886, and the system message 880 are also displayed on the live-streaming room screen on the display of the viewer's user terminal 30.

Figure 26:
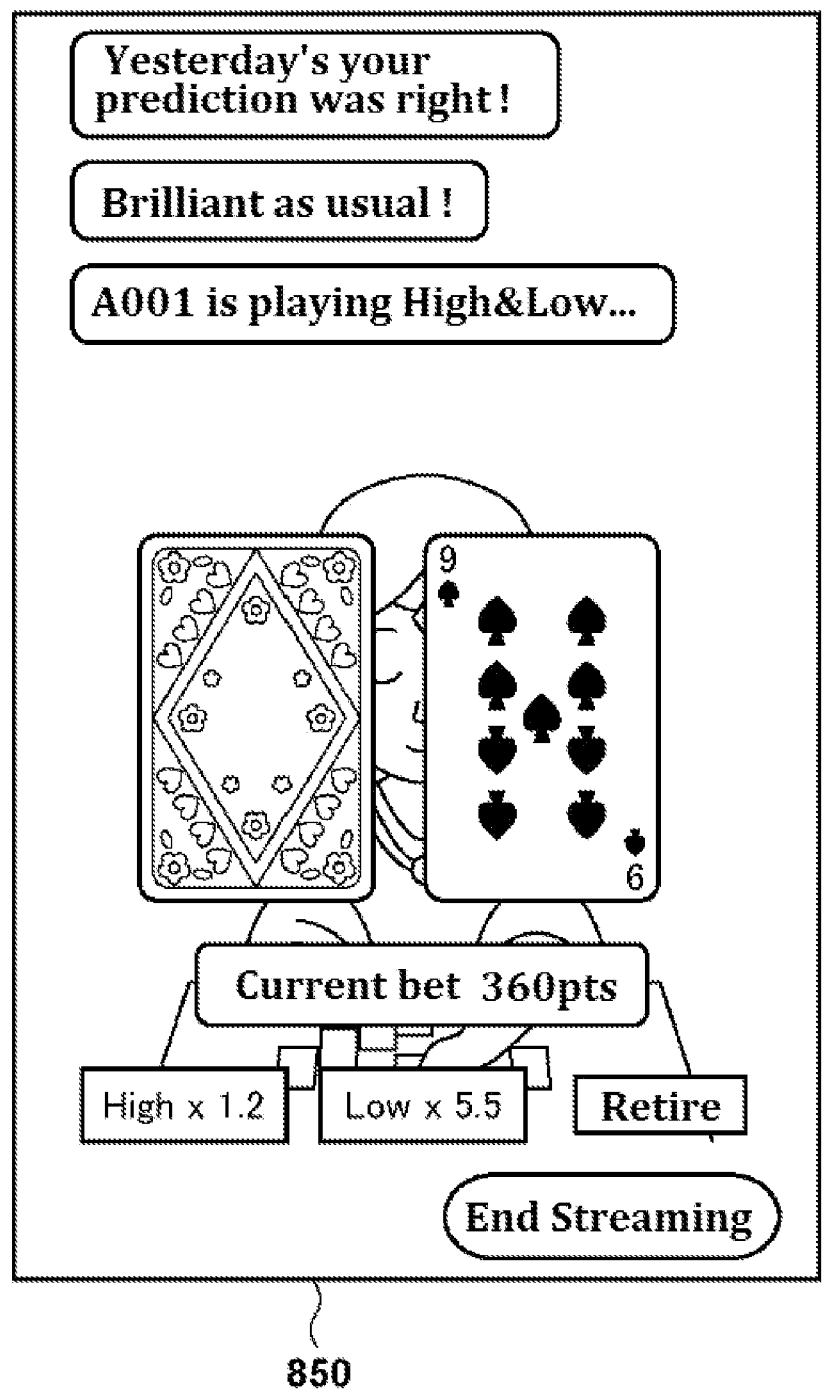
FIG. 26 is a representative screen image of a live-streaming room screen on the display of the distributor's user terminal.

FIG. 26 is a representative screen image of the live-streaming room screen 850 shown on the display of the distributor's user terminal 20. Once the viewer taps the screen of the live-stream selection screen 850 of FIG. 25, the live-streaming room screen 850 of FIG. 26 is shown. The configuration of the live-streaming room screen 850 of FIG. 26 is the same as the configuration of the live-streaming room screen 850 of FIG. 23 except that the information has been updated.

In the above embodiment, an example of the holding unit includes a hard disk or semiconductor memory. It is understood by those skilled in the art that each element or component can be realized by a CPU not shown, a module of an installed application program, a module of a system program, or a semiconductor memory that temporarily stores the contents of data read from a hard disk, and the like.

In the live-streaming system 1 according to the embodiment, when a viewer gives the special gift to a distributor, the distributor is requested to provide input, and whether or not a reward is given to the distributor and the amount of the reward are determined depending on the content of the distributor's input(s). This causes more interaction between distributors and viewers, such as not only exchanges where the viewers give gifts and the distributor thank them but also discussions on which option to choose and praise for distributor's winning. As a result, the connection between the distributors and the viewers can be strengthened.

Further, in the live-streaming system 1 according to the embodiment, it is possible to determine whether to give a reward and/or the amount of the reward depending on the contents of the multiple inputs. This increases the flexibility of gift design and provide a more enjoyable gift experience to the distributors and viewers.

Figure 27:
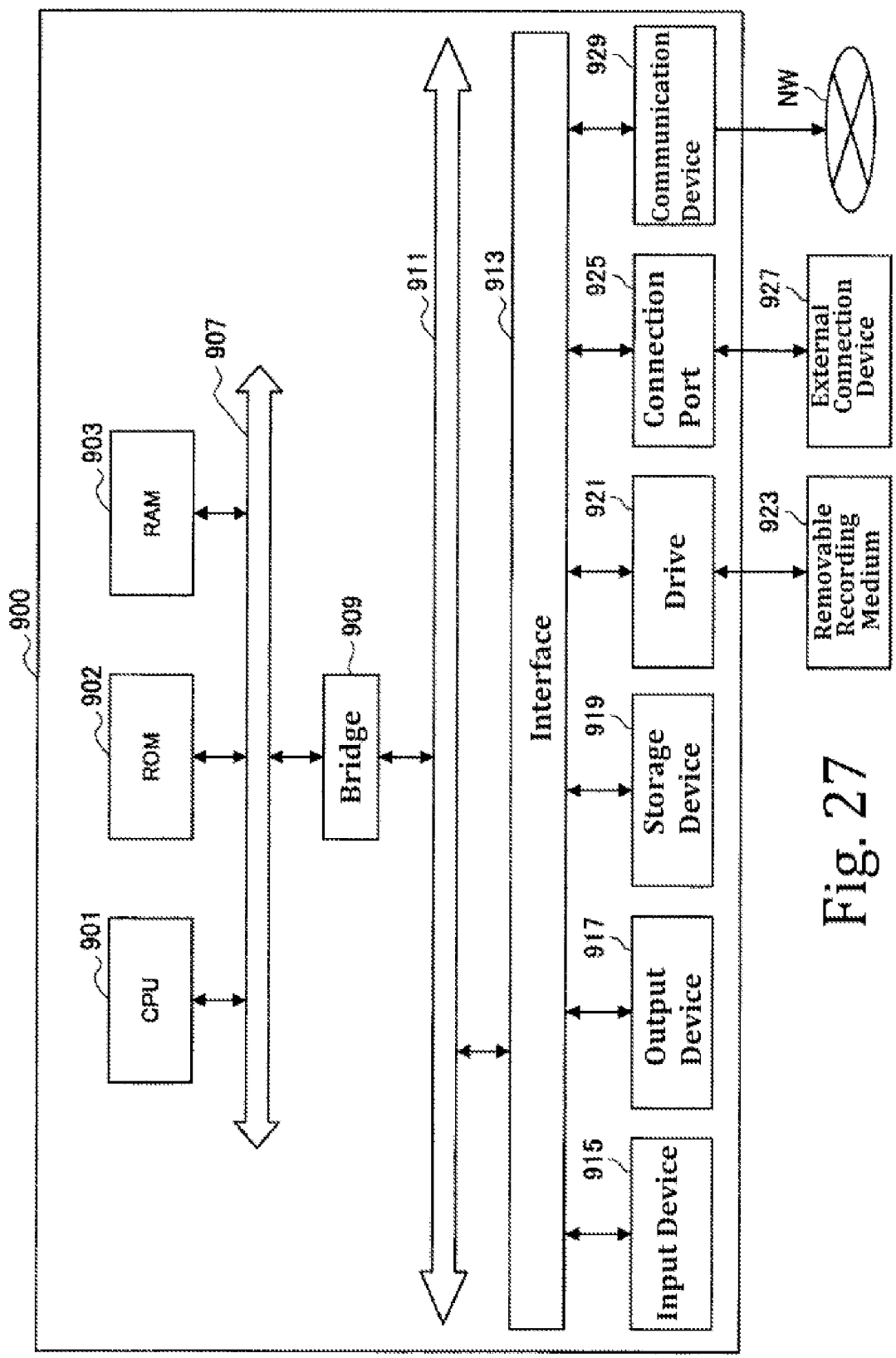
FIG. 27 is a block diagram showing an example of a hardware configuration of an information processing device according to the embodiment.

Referring to FIG. 27, the hardware configuration of the information processing device will be now described. FIG. 27 is a block diagram showing an example of the hardware configuration of the information processing device according to the embodiment. The illustrated information processing device 900 may, for example, realize the server 10 and the user terminals 20 and 30 in the embodiment.

The information processing device 900 includes a CPU 901, ROM (Read Only Memory) 902, and RAM (Random Access Memory) 903. The information processing device 900 may also include a host bus 907, a bridge 909, an external bus 911, an interface 913, an input device 915, an output device 917, a storage device 919, a drive 921, a connection port 925, and a communication device 929. In addition, the information processing device 900 includes an image capturing device such as a camera (not shown). In addition to or instead of the CPU 901, the information processing device 900 may also include a DSP (Digital Signal Processor) or ASIC (Application Specific Integrated Circuit).

The CPU 901 functions as an arithmetic processing device and a control device, and controls all or some of the operations in the information processing device 900 according to various programs stored in the ROM 902, the RAM 903, the storage device 919, or a removable recording medium 923. For example, the CPU 901 controls the overall operation of each functional unit included in the server 10 and the user terminals 20 and 30 in the embodiment. The ROM 902 stores programs, calculation parameters, and the like used by the CPU 901. The RAM 903 serves as a primary storage that stores a program used in the execution of the CPU 901, parameters that appropriately change in the execution, and the like. The CPU 901, ROM 902, and RAM 903 are interconnected to each other by the host bus 907 which may be an internal bus such as a CPU bus. Further, the host bus 907 is connected to the external bus 911 such as a PCI (Peripheral Component Interconnect/Interface) bus via the bridge 909.

The input device 915 may be a user-operated device such as a mouse, keyboard, touch panel, buttons, switches and levers, or a device that converts a physical quantity into an electric signal such as a sound sensor typified by a microphone, an acceleration sensor, a tilt sensor, an infrared sensor, a depth sensor, a temperature sensor, a humidity sensor, and the like. The input device 915 may be, for example, a remote control device utilizing infrared rays or other radio waves, or an external connection device 927 such as a mobile phone compatible with the operation of the information processing device 900. The input device 915 includes an input control circuit that generates an input signal based on the information inputted by the user or the detected physical quantity and outputs the input signal to the CPU 901. By operating the input device 915, the user inputs various data and instructs operations to the information processing device 900.

The output device 917 is a device capable of visually or audibly informing the user of the obtained information. The output device 917 may be, for example, a display such as an LCD, PDP, or OELD, etc., a sound output device such as a speaker and headphones, and a printer. The output device 917 outputs the results of processing by the information processing device 900 as text, video such as images, or sound such as audio.

The storage device 919 is a device for storing data configured as an example of a storage unit of the information processing device 900. The storage device 919 is, for example, a magnetic storage device such as a hard disk drive (HDD), a semiconductor storage device, an optical storage device, or an optical magnetic storage device. This storage device 919 stores programs executed by the CPU 901, various data, and various data obtained from external sources.

The drive 921 is a reader/writer for the removable recording medium 923 such as a magnetic disk, an optical disk, a photomagnetic disk, or a semiconductor memory, and is built in or externally attached to the information processing device 900. The drive 921 reads information recorded in the mounted removable recording medium 923 and outputs it to the RAM 903. Further, the drive 921 writes record in the attached removable recording medium 923.

The connection port 925 is a port for directly connecting a device to the information processing device 900. The connection port 925 may be, for example, a USB (Universal Serial Bus) port, an IEEE1394 port, an SCSI (Small Computer System Interface) port, or the like. Further, the connection port 925 may be an RS-232C port, an optical audio terminal, an HDMI (registered trademark) (High-Definition Multimedia Interface) port, or the like. By connecting the external connection device 927 to the connection port 925, various data can be exchanged between the information processing device 900 and the external connection device 927.

The communication device 929 is, for example, a communication interface formed of a communication device for connecting to the network NW. The communication device 929 may be, for example, a communication card for a wired or wireless LAN (Local Area Network), Bluetooth (trademark), or WUSB (Wireless USB). Further, the communication device 929 may be a router for optical communication, a router for ADSL (Asymmetric Digital Subscriber Line), a modem for various communications, or the like. The communication device 929 transmits and receives signals and the like over the Internet or to and from other communication devices using a predetermined protocol such as TCP/IP. The communication network NW connected to the communication device 929 is a network connected by wire or wirelessly, and is, for example, the Internet, home LAN, infrared communication, radio wave communication, satellite communication, or the like. The communication device 929 realizes a function as a communication unit.

The image capturing device (not shown) is, for example, a camera for capturing an image of the real space to generate the captured image. The image capturing device uses an imaging element such as a CCD (Charge Coupled Device) or CMOS (Complementary Metal Oxide Semiconductor) and various elements such as lenses that are provided to control image formation of a subject on the imaging element. The image capturing device may capture a still image or may capture a moving image.

The configuration and operation of the live-streaming system 1 in the embodiment have been described. This embodiment is a merely example, and it is understood by those skilled in the art that various modifications are possible for each component and a combination of each process, and that such modifications are also within the scope of the present disclosure.

In the above embodiment, as examples how to determine whether to award electronic value to the distributor and/or the amount of electronic value awarded to the distributor, (1) jackpot or not, (2) the number of consecutive wins, and (3) drawing continues until the distributor draws a losing object or retires. As another example, drawing may not be repeated, and only one of a plurality of objects may corresponds to a win and the rest may correspond to no reward. As yet another example, the number of times the distributor is allowed to challenge the drawing or game may be fixed, and the reward to be given may be determined depending on how many times the distributor wins. For example, as shown in FIG. 11, selection of a treasure box may be performed five times, and the amount of the reward given may be determined according to the number of wins.

In the embodiment, when a viewer follows the distributor or subscribes to the distributor's subscription service, the probability of winning may be set higher than otherwise.

In the embodiment, the case where multiple inputs are sequentially accepted has been described, but the embodiment is not limited to this, and the multiple inputs may be collectively received at once.

In the embodiment, the special gift may be configured such that the larger the price points of the special gift, the easier it is to obtain the reward. For example, the number of challenges allowed for the distributor may be increased as the price points are increased, or the number of winning objects may be increased.

The conversion rate from the points paid for the gift to the granted reward in the embodiment is merely example, and the conversion rate may be appropriately set by the administrator of the live-streaming system 1, for example.

The technical idea according to the embodiment may be applied to live commerce or virtual live-streaming using an avatar that moves in synchronization with the movement of the distributor instead of the image of the distributor.

The procedures described herein, particularly those described with a flow diagram, a flowchart, are susceptible of omission of part of the steps constituting the procedure, adding steps not explicitly included in the steps constituting the procedure, and/or reordering the steps. The procedure subjected to such omission, addition, or reordering is also included in the scope of the present invention unless diverged from the purport of the present invention.

At least some of the functions realized by the server 10 may be realized by a device(s) other than the server 10, for example, the user terminals 20 and 30. At least some of the functions realized by the user terminals 20 and 30 may be realized by a device(s) other than the user terminals 20 and 30, for example, the server 10. For example, the superimposition of a predetermined frame image on an image of the video data performed by the viewer's user terminal may be performed by the server 10 or may be performed by the distributor's user terminal.

What is claimed is:

1. A terminal of a distributor of a live-stream, comprising:
one or more processors;
memory storing one or more computer programs configured to be executed by the one or more processors; and
a display,
wherein the one or more computer programs includes instructions for:
transmitting video data related to the live-stream to a server over a network, the live-stream being distributed to a plurality of viewers;
displaying, on the display, a plurality of objects associated with a single gift used by a first viewer among the plurality of viewers for the distributor, the single gift being used upon payment by the first viewer of price points set for the single gift, the plurality of objects including a winning object;
accepting selection of one of the plurality of objects by the distributor;
obtaining a result of an award determination, the award determination being performed to determine an amount of the electronic value awarded to the distributor in response to the accepted selection, the amount of the electronic value awarded to the distributor upon selection of the winning object being greater than the price points for the single gift, and displaying, on the display during the live-stream, the result of the award determination.

2. The terminal of claim 1, wherein the single gift is used by the first viewer of the live-stream during the live-stream, and wherein the result of the award determination is also shown on a display of a terminal of the first viewer of the live-stream.

3. The terminal of claim 1, wherein the one or more computer programs further include instructions for:

providing a message from the first viewer of the live-stream to the distributor during a period in which the selection related to the used single gift can be accepted.

4. The terminal of claim 1, wherein the amount of the electronic value awarded to the distributor differs depending on which object is selected, and wherein an effect displayed when the result is shown on the display differs depending on the amount of the electronic value awarded to the distributor.

5. The terminal of claim 1, wherein the accepting the selection includes:

displaying a plurality of new objects on the display when the selected object corresponds to the winning object; and stopping accepting the selection when the selected object corresponds to a losing object.

6. A method, comprising:

transmitting video data related to the live-stream to a server over a network, the live-stream being distributed to a plurality of viewers;

displaying, on the display, a plurality of objects associated with a single gift used by a first viewer among the plurality of viewers for the distributor, the single gift being used upon payment by the first viewer of price points set for the single gift, the plurality of objects including a winning object;

accepting selection of one of the plurality of objects by the distributor;

obtaining a result of an award determination the award determination being performed to determine an amount of the electronic value awarded to the distributor in response to the accepted selection, the amount of the electronic value awarded to the distributor upon selection of the winning object being greater than the price points for the single gift; and displaying, on the display during the live-stream, the result of the award determination.

7. The method of claim 6, wherein the single gift is used by the first viewer of the live-stream during the live-stream, and wherein the result of the award determination is also shown on a display of a terminal of the first viewer of the live-stream.

8. The method of claim 6 further comprising:

providing a message from the first viewer of the live-stream to the distributor during a period in which the selection related to the used single gift can be accepted.

9. The method of claim 6, wherein the amount of the electronic value awarded to the distributor differs depending on which object is selected, and wherein an effect displayed when the result is shown on the display differs depending on the amount of the electronic value awarded to the distributor.

10. The method of claim 6, wherein the accepting the selection includes:

displaying a plurality of new objects on the display when the selected object corresponds to the winning object; and stopping accepting the selection when the selected object corresponds to a losing object.

11. A server, comprising:

a relay unit for transmitting a video data related to a live-stream from a distributor's terminal to a plurality of viewer's terminals;

a receiving unit for receiving a gift use signal from one of the viewer's terminals during the live-stream over a network, the gift use signal indicating that a single gift is used for the distributor, the single gift being used upon payment by the first viewer of price points set for the single gift;

a transmitter for transmitting, in response to the reception of the gift use signal, a request signal to the distributor's terminal over the network, the request signal requesting selection associated with one of a plurality of objects, each of the plurality of objects being associated with the single gift, the plurality of objects including a winning object;

a receiving unit for receiving a response signal from the distributor's terminal over the network, the response signal indicating which one of the plurality of objects is selected a content of the selection by the distributor;

a determining unit for determining an amount of the electronic value awarded to the distributor depending on the content of the selection indicated by the response signal, the amount of the electronic value awarded to the distributor upon selection of the winning object being greater than the price points for the single gift; and a result transmitter for transmitting a result of the determination to the distributor's terminal and the viewer's terminals during the live-stream over the network.

* * * * *